US010252189B2

United States Patent
Matsumura et al.

(10) Patent No.: US 10,252,189 B2
(45) Date of Patent: Apr. 9, 2019

(54) DEFOAMING AGENT

(75) Inventors: Yohei Matsumura, Kyoto (JP); Nobuo Hisada, Kyoto (JP); Yoshihide Izumi, Nagoya (JP)

(73) Assignee: SAN NOPCO LTD., Kyoto-shi (JP)

(*) Notice: Subject to any disclaimer, the term of this patent is extended or adjusted under 35 U.S.C. 154(b) by 371 days.

(21) Appl. No.: 14/346,608

(22) PCT Filed: Sep. 11, 2012

(86) PCT No.: PCT/JP2012/073121
§ 371 (c)(1),
(2), (4) Date: Mar. 21, 2014

(87) PCT Pub. No.: WO2013/061700
PCT Pub. Date: May 2, 2013

(65) Prior Publication Data
US 2014/0221508 A1    Aug. 7, 2014

(30) Foreign Application Priority Data
Oct. 24, 2011  (JP) ................................. 2011-232664

(51) Int. Cl.
B01D 19/04    (2006.01)

(52) U.S. Cl.
CPC ............................... B01D 19/0409 (2013.01)

(58) Field of Classification Search
CPC ........................... B01D 19/0409; B01D 19/04
USPC ................................... 516/116, 117, 118, 121
See application file for complete search history.

(56) References Cited

U.S. PATENT DOCUMENTS

| | | | | |
|---|---|---|---|---|
| 3,267,042 A * | 8/1966 | Domba | ............... | B01D 19/0409 516/117 |
| 4,274,977 A * | 6/1981 | Koerner | ............. | B01D 19/0404 516/117 |
| 4,477,371 A * | 10/1984 | Huber | ................ | B01D 19/0409 516/121 |
| 5,438,083 A * | 8/1995 | Takimoto | ............. | C09D 17/004 523/401 |
| 2003/0175221 A1* | 9/2003 | Gers-Barlag | ............ | A61K 8/06 424/59 |
| 2004/0131527 A1* | 7/2004 | Gottschalk-Gaudig | ...................... | B82Y 30/00 423/335 |
| 2006/0111453 A1 | 5/2006 | Bonn et al. | | |
| 2007/0111917 A1* | 5/2007 | Lang | .................... | C11D 3/1253 510/417 |
| 2007/0281878 A1* | 12/2007 | Gottschalk-Gaudig | ...................... | A61K 8/06 510/417 |
| 2008/0021152 A1 | 1/2008 | Rautschek et al. | | |
| 2010/0234230 A1* | 9/2010 | Fowler | .................... | A01N 25/04 504/289 |
| 2010/0292079 A1* | 11/2010 | Fowler | .................... | A01N 25/04 504/101 |
| 2012/0177938 A1* | 7/2012 | Goto | ..................... | C10M 169/04 428/544 |
| 2013/0137572 A1* | 5/2013 | Fowler | ................... | A01N 25/10 504/101 |

FOREIGN PATENT DOCUMENTS

| | | | |
|---|---|---|---|
| FR | 2 926 229 A1 | * | 7/2009 |
| JP | 2000-288308 A | | 10/2000 |
| JP | 2003-230804 A | | 8/2003 |
| JP | 2006-501984 A | | 1/2006 |
| JP | 2006-095506 A | | 4/2006 |
| JP | 2008-509811 A | | 4/2008 |
| JP | 2011063765 A | * | 3/2011 |
| WO | 95/21013 A1 | | 8/1995 |

OTHER PUBLICATIONS

Wacker brochure entitled Products and Applications, Wacker HDK®Fumed Silica, Wacker-Chemie GmbH, Silicones Division, Muchen, Germany (Jan. 2000), pp. 1-8.*
English Language Machine translation on espacenet.com, FR 2 926 229 A1 (Jul. 17, 2009), online @ http://worldwide.espacenet.com, pp. 1-15 (downloaded Feb. 16, 2016).*
Derwent Abstract on East, week 201309, London: Derwent Publications Ltd., AN 2011-C88655, JP 2011-063785 A, (Kyodo Yushi KK), abstract.*
Evonik Industries, "Basic characteristics of Aerosil® fumed silica Technical Bulletin Fine Particles 11", Evonik Degussa Corporation, Inorganic Materials, Parsippany, NJ 07054-0677, USA (Jul. 2006), online @ http://www.aerosil.com/product/aerosil/en/services/downloads/Pages/brochures.aspx , pp. 1, 3-7, 11-14, and 68-70.*
The Merck Index an Encyclopedia of Chemicals, Drugs, and Biologicals, Tenth Edition, (Merck & Co, Inc. Rahway, NJ, 1983) p. 880, Entry 6023. Metolachlor, Jan. 17, 1984.*
Binks et al, Transitional Phase Inversion of Solid-Stabilized Emulsions Using Particle Mixtures, Langmuir 2000, 16, 3748-3756.*

(Continued)

*Primary Examiner* — Daniel S Metzmaier
(74) *Attorney, Agent, or Firm* — Westerman, Hattori, Daniels & Adrian, LLP

(57) ABSTRACT

An object of the present invention is to provide an oil-in-water emulsion defoaming agent that is superior in defoaming properties (initial defoaming property and defoaming durability) and stability (emulsion stability). The present invention provides an oil-in-water emulsion defoaming agent including hydrophilic fumed silica (C), wherein an oil phase (A) is emulsified and dispersed in a water phase (B). Preferably, the content of the oil phase (A) is 10 to 50% by weight, the content of the hydrophilic fumed silica (C) is 0.1 to 6% by weight, and the content of the water phase (B) is 44 to 89.9% by weight based on the weight of the oil phase (A), the hydrophilic fumed silica (C), and the water phase (B). The weight ratio (A/C) of the oil phase (A) to the hydrophilic fumed silica (C) is preferably from 2 to 100.

2 Claims, No Drawings

(56) References Cited

OTHER PUBLICATIONS

Gerry Davison, Bruce Lane and Hans-Guenther Schulte; "Antifoams," in Additives in Water-Borne Coatings, Editors: Gerry Davison, Bruce C Lane; (Aug. 2003) pp. 61-76, Royal Society of Chemistry, London, England. (Year: 2003).*
International Search Report for PCT/JP2012/073121, dated Dec. 18, 2012.
Notification of Transmittal of Translation of the International Preliminary Report on Patentability (form PCT/IB/338) dated May 8, 2014, issued in International Application No. PCT/JP2012/073121, with forms PCT/IB/373 and PCT/ISA/237 (9 pages).
Office Action dated Jan. 19, 2016, issued in counterpart Japanese Patent Application No. 2013-540697, with English translation. (7 pages).
Office Action dated Dec. 1, 2015, issued in counterpart Japanese Patent Application 2013-540697, with English translation. (10 pages).

* cited by examiner

DEFOAMING AGENT

TECHNICAL FIELD

The present invention relates to a defoaming agent.

BACKGROUND ART

There are known oil-in-water emulsion defoaming agents in which a defoaming agent in which an amide that is a reaction product of an alkylene polyamine and a fatty acid, a wax, hydrophobic silica, and the like are dispersed in a hydrocarbon oil is emulsified and dispersed with a surfactant (Patent Documents 1 and 2).

PRIOR ART DOCUMENTS

Patent Documents

Patent document 1: JP-T-2006-501984 (corresponding US application: US 2006/0111453 A1)
Patent document 2: JP-A-2006-95506

DISCLOSURE OF THE INVENTION

Problems to be Solved by the Invention

Conventional oil-in-water emulsion defoaming agents, which are emulsified and dispersed with a surfactant, have the problem that the durability of their defoaming effect is poor. Moreover, since properties of a surfactant are changed with temperature changes, conventional oil-in-water emulsion defoaming agents have the problem that their stability (emulsion stability) against temperature changes is so low that an emulsion is destroyed easily and separates if the temperature is raised and lowered repeatedly.

An object of the present invention is to provide an oil-in-water emulsion defoaming agent that is superior in defoaming properties (initial defoaming property and defoaming durability) and stability (emulsion stability).

Solutions to the Problems

The present inventors have reached the present invention as a result of earnest studies performed for attaining the above-mentioned object and by finding out that specific hydrophilic silica is used to thereby attain the object and remarkably improve the defoaming property and the stability of an oil-in-water emulsion defoaming agent.

That is, the defoaming agent of the present invention is characterized by containing hydrophilic fumed silica (C), wherein an oil phase (A) is dispersed in a water phase (B).

The production method (1) of the present invention characterized in that it is a method for producing the above-mentioned oil-in-water emulsion defoaming agent, the method including a dispersing and disaggregating step (i) of obtaining a dispersion liquid (BC1) having a median diameter (d50, by number) of hydrophilic fumed silica of 20 to 300 nm while dispersing and disaggregating the hydrophilic fumed silica (C) in the water phase (B), and an emulsifying and dispersing step (ii) of emulsifying and dispersing the dispersion liquid (BC1) prepared in the dispersing and disaggregating step (i) and the oil phase (A) to obtain an oil-in-water emulsion defoaming agent.

The production method (2) of the present invention is characterized by including a dispersing and disaggregating step (iii) of obtaining a dispersion liquid (BC2) having a median diameter (d50, by number) of hydrophilic fumed silica of 20 to 300 nm while dispersing and disaggregating the hydrophilic fumed silica (C) in a part of the water phase (B), a mixing and dispersing step (iv) of mixing and dispersing the oil phase (A) and the rest of the water phase (B) to obtain a mixed dispersion liquid (AB), and an emulsifying and dispersing step (v) of emulsifying and dispersing the mixed dispersion liquid (AB) and the dispersion liquid (BC2) to obtains an oil-in-water emulsion defoaming agent.

The production method (3) of the present invention is characterized by including a dispersing and disaggregating step (vi) of obtaining a dispersion liquid (AC) of hydrophilic fumed silica while dispersing and disaggregating the hydrophilic fumed silica (C) in the oil phase (A), and an emulsifying and dispersing step (vii) of emulsifying and dispersing the dispersion liquid (AC) and the water phase (B) to obtains an oil-in-water emulsion defoaming agent.

Advantages of the Invention

The defoaming agent of the present invention demonstrates remarkably excellent defoaming properties (initial defoaming property and defoaming durability) and remarkably excellent stability (emulsion stability).

The use of the methods (1) to (3) for producing a defoaming agent of the present invention makes it possible to produce the above-mentioned defoaming agent easily.

MODE FOR CARRYING OUT THE INVENTION

Any dry silica synthesized from vaporized silicon chloride via a vapor phase reaction in a hot hydrogen flame can be used as the hydrophilic fumed silica (C).

The hydrophilic fumed silica (C) can be obtained from the market easily and examples thereof include AEROSIL series (130, 200, 300, and the like, available from Nippon Aerosil Co., Ltd.; "AEROSIL" is a registered trademark), Dry Silica HDK series (S13, V15, N20, T30, and the like, available from Wacker Asahikasei Silicone Co., Ltd.; "HDK" is a registered trademark), REOLOSIL series (QS-10, QS-30, QS-40, QS-102, available from Tokuyama Corporation; "REOLOSIL" is a registered trademark), and CAB-O-SIL EH-5, CAB-O-SIL HS-5, and CAB-O-SIL M-5 (available from Cabot Corporation; "CAB-O-SIL" is a registered trademark).

The hydrophilic fumed silica (C) is considered to be operative to assist the oil phase (A) to be emulsified and dispersed in the water phase (B) (in other words, it is considered to greatly contribute to stability), and it is considered that most of the hydrophilic fumed silica (C) is present between the water phase (B) and the oil phase (A) in the oil-in-water emulsion defoaming agent of the present invention. It is also considered that the hydrophilic fumed silica (C) improves the initial defoaming property slightly and does not deteriorate the defoaming durability. Any silica other than the hydrophilic fumed silica (C) (e.g., fused silica, precipitated silica, and gel-processed silica) cannot exert the effect of the present invention.

The BET specific surface area ($m^2/g$, measured by nitrogen gas adsorption) of the hydrophilic fumed silica (C) is preferably 20 to 450, more preferably 30 to 440, particularly preferably 40 to 430, and most preferably 50 to 420.

The BET specific surface area (m²/g, measured by nitrogen gas adsorption) of the hydrophilic fumed silica (C) is measured on the basis of ISO 5794-1/Annex D using a BET specific surface area analyzer (e.g., TRISTAR3000, available from Micromeritics) in accordance with the multipoint determination of DIN ISO9277.

Although the hydrophilic fumed silica (C) may be used while being dispersed in the oil phase before emulsification, while being dispersed in the water phase before emulsification, or while being dispersed in the emulsion during emulsification or after emulsification, a method of using it with it dispersed in the water phase before emulsification and a method of using it with it dispersed in the emulsion during emulsification or after emulsification are preferred, the method of using it with it dispersed in the water phase before emulsification is more preferred, and a method of using it with it dispersed in the water phase before emulsification so as to have a median diameter (d50, by number) of 20 to 300 nm is particularly preferred.

The oil phase (A) is a component for demonstrating defoaming properties (initial defoaming property and defoaming durability), and publicly known oil-based defoaming agents and the like can be used. Preferred examples of the oil phase (A) include ones containing a base oil (E) that is liquid at 25° C. as an essential constituent.

As the base oil (E) that is liquid at 25° C., mineral oils, fats and oils, monoalcohol fatty acid esters, silicones and/or polyethers can be used.

As the mineral oils, one refined by appropriately combining distillation under reduced pressure, oil deasphalting, solvent extraction, hydrocracking, solvent dewaxing, sulfuric acid washing, clay refining, hydrorefining, and the like can be used, and examples of the trade name thereof include COSMO PURESPIN G, COSMO PURESPIN E, COSMO SP-10, COSMO SP-32, and COSMO SC22 (all manufactured by COSMO OIL Co., Ltd.; "COSMO" and "PURESPIN" are registered trademarks of the company), MC Oil P-22 and S-10S (all manufactured by Idemitsu Kosan Co., Ltd.), and STANOL 40 (manufactured by Exxon Mobil Corporation).

Examples of the fats and oils include esters of fatty acids having 6 to 22 carbon atoms or mixtures thereof with glycerol, and specifically include vegetable oils (rapeseed oil, soybean oil, palm oil, coconut oil, olive oil, and the like), medium chain fatty acid glycerides (examples of the trade name thereof include PANACET 875, available from NOF Corporation; "PANACET" is a registered trademark of this company), and fish oils.

Examples of the monoalcohol fatty acid esters include esters of fatty acids having 6 to 22 carbon atoms or mixtures thereof with monoalcohols having 1 to 22 carbon atoms, the esters being liquid at 25° C., and specifically include methyl oleate, butyl oleate, and methyl isostearate.

Examples of the silicones include silicone oil and modified silicone oil.

Examples of the silicone oil include polydimethylsiloxanes having a kinematic viscosity of 10 to 10000 (mm²/s, at 25° C.) and also include cyclooctamethyltetrasiloxane.

Examples of the modified silicone include ones resulting from substituting some of the methyl groups of the above-mentioned dimethylsiloxane with an alkyl group having 2 to 6 carbon atoms, an alkoxyl group having 2 to 4 carbon atoms, a phenyl group, a hydrogen atom, a halogen (chlorine, bromine, or the like) atom, an alkoxypolyoxyalkylene oxypropyl group (the alkoxy has 1 to 6 carbon atoms; the alkylene has 2 to 3 carbon atoms; the degree of polymerization is 2 to 50; and the weight of the oxyethylene group is less than 20% by weight of the overall weight of the oxyalkylene group), an alkoxypolyoxyalkylene group (the alkoxy has 1 to 6 carbon atoms; the alkylene has 2 to 3 carbon atoms; the degree of polymerization is 2 to 50; and the weight of the oxyethylene group is less than 20% by weight of the overall weight of the oxyalkylene group) and/or an aminoalkyl group having 2 to 6 carbon atoms.

As the polyethers, ones having an HLB of 0 to 3.4 can be used, preferred are ones having an HLB of 0 to 2.9, more preferred are ones having an HLB of 0 to 2.4, and most preferred are ones having an HLB of 0 to 1.9. An HLB is determined by the method disclosed in "Shin kaimenkasseizai nyumon" (Takehiko Fujimoto, published by Sanyo Chemical Industries, Ltd., October, 1981), pp. 128-131 (corresponding English version: New Introduction to Surface Active Agents, SANYO CHEMICAL INDUSTRIES, LTD., 1985, pp. 127-130, the disclosure of which is herein incorporated by reference).

Examples of the polyethers include reaction products of 1 mol of a monoalcohol having 1 to 22 carbon atoms, a monocarboxylic acid having 1 to 22 carbon atoms, or a monoamine having 1 to 22 carbon atoms with 1 to 100 mol of an alkylene oxide having 2 to 4 carbon atoms, reaction products of 1 mol of a polyol having 2 to 6 carbon atoms with 1 to 300 mol of an alkylene oxide having 2 to 4 carbon atoms, esterification products of "reaction products of 1 mol of a polyol having 2 to 6 carbon atoms with 1 to 300 mol of an alkylene oxide having 2 to 4 carbon atoms" with fatty acids having 1 to 22 carbon atoms, and esterification products of "reaction products of 1 mol of a monoalcohol having 1 to 22 carbon atoms with 1 to 300 mol of an alkylene oxide having 2 to 4 carbon atoms" with fatty acids having 1 to 22 carbon atoms.

Of the options of the base oil (E), mineral oils, fats and oils, silicones, and polyethers are preferred, and combinations of some or all of them are more preferred.

Preferably, the oil phase (A) further comprises a nucleating agent (D).

Examples of the nucleating agent (D) include ones incapable of being dissolved in the base oil (E) that is liquid at 25° C. and capable of being dispersed in this base oil (E), and one or more members selected from the group consisting of hydrophobic silica (Da), a fatty acid amide (Db), a petroleum wax (Dc), a synthetic wax (Dd), a vegetable wax (De), and synthetic resin fine particles (Df) can be used.

Examples of the hydrophobic silica (Da) include hydrophobic silica prepared by hydrophobizing a silica powder with a hydrophobizing agent.

Exemplary trade names of the commercially available hydrophobic silica include Nipsil SS-10, SS-40, SS-50, and SS-100 (Tosoh Silica Corporation, "Nipsil" is a registered trademark of Tosoh Silica Corporation), AEROSIL R972, RX200, and RY200 (Nippon Aerosil Co., Ltd., "AEROSIL" is a registered trademark of Evonik Degussa GmbH), SIPERNAT D10, D13, and D17 (Degussa Japan Co., Ltd., "SIPERNAT" is a registered trademark of Evonik Degussa GmbH), TS-530, TS-610, and TS-720 (Cabot Carbon Corporation), AEROSIL 8202, R805, and R812 (Degussa Japan Co., Ltd.), REOLOSIL MT-10, DM-10, and DM-20S (Tokuyama Corporation, "REOLOSIL" is a registered trademark of this company), and SYLOPHOBIC100, 702, 505, and 603 (Fuji Silysia Chemical Ltd., "SYLOPHOBIC" is a registered trademark of this company).

The fatty acid amide (Db) includes a reaction product (fatty acid diamide) of an alkylenediamine having 1 to 6 carbon atoms or an alkenylenediamine having 1 to 6 carbon atoms with a fatty acid having 10 to 22 carbon atoms and/or a reaction product (fatty acid monoamide) of an alkylamine having 1 to 22 carbon atoms, an alkenylamine having 1 to 22 carbon atoms, or ammonia with a fatty acid having 10 to 22 carbon atoms.

Examples of the fatty acid diamide include ethylenebis-stearylamide, ethylenebis-palmitylamide, ethylenebis-myristylamide, ethylenebis-laurylamide, ethylenebis-oleylamide, propylenebis-stearylamide, propylenebis-palmitylamide, propylenebis-myristylamide, propylenebis-laurylamide, propylenebis-oleylamide, butylenebis-stearylamide, butylenebis-palmitylamide, butylenebis-myristylamide, butylenebis-laurylamide, butylenebis-oleylamide, methylenebis-laurylamide, methylenebis-stearylamide, and hexamethylenebis-stearylamide.

Examples of the fatty acid monoamide include N-stearylstearylamide, oleamide, erucamide, and stearylamide.

Among them, the fatty acid diamide is preferred from the viewpoint of defoaming property and the like. More preferred are ethylene bis-stearylamide, ethylene bis-palmitylamide, ethylene bis-laurylamide, methylene bis-stearylamide, and hexamethylene bis-stearylamide, and particularly preferred are ethylene bis-stearylamide, ethylene bis-palmitylamide, and ethylene bis-myristylamide. These amides may be in the form of a mixture of two or more members, and in the case of a mixture, it is preferred that any of the aforementioned preferable members be contained as a primary component.

The primary component means a component that is contained in at least 40% by weight based on the weight of the fatty acid amide (Db), preferably in 50% by weight or more, more preferably in 60% by weight or more, particularly preferably in 70% by weight or more, and most preferably in 80% by weight or more.

Examples of auxiliary components (components contained in addition to the primary component) in the fatty acid amide (Db) include an unreacted amine and an unreacted carboxylic acid as well as amides other than those within the aforementioned preferred range. The content (% by weight) of the auxiliary components is preferably less than 60, more preferably less than 50, particularly preferably less than 40, more preferably less than 30, and most preferably less than 20 based on the weight of the fatty acid amide (Db).

Examples of the petroleum wax (Dc) include waxes that cannot be dissolved and can be dispersed in an oil phase at 40° C. and that are by-produced from petroleum refining, and specifically include microcrystalline wax and paraffin wax.

Examples of the synthetic wax (Dd) include waxes that cannot be dissolved and can be dispersed in an oil phase at 40° C. and that can be prepared by chemical synthesis, and specifically include Fischer-Tropsch wax, polyethylene wax, oxidized polyethylene wax, alcohol-modified wax, and maleic acid-modified oxidized polyethylene wax.

Examples of the vegetable wax (De) include waxes that cannot be dissolved and can be dispersed in an oil phase at 40° C. and that are extracted from plants, and specifically include carnauba wax and Japan wax.

Examples of the synthetic resin fine particles (Df) include synthetic resin fine particles (Df1) containing an ethylenically unsaturated monomer (m1) as a constitutional unit or synthetic resin fine particles (Df2) containing a monomer for polycondensation and polyaddition (m2) as a constitutional unit.

Examples of the ethylenically unsaturated monomer (m1) include publicly known ethylenically unsaturated monomers, and there can be used (meth)acrylic acid; alkyl esters (having 1 to 22 carbon atoms) of (meth)acrylic acid {methyl (meth)acrylate, ethyl (meth)acrylate, butyl (meth)acrylate, (2-ethylhexyl) (meth)acrylate stearyl (meth)acrylate, behenyl (meth)acrylate, and the like}; (meth)acrylates of adducts of alkylene oxide (having 2 to 4 carbon atoms) to alcohols having 1 to 18 carbon atoms {(meth)acrylates of adducts of 30 mol propylene oxide to methanol, (meth)acrylates of adducts of 30 mol propylene oxide to 2-ethylhexanol, (meth) acrylates of adducts of 30 mol ethylene oxide to stearylalcohol, and the like}; (meth)acrylonitrile; styrenes {styrene, methylstyrene, and hydroxystyrene}; diaminoethyl (meth) acrylate; polyfunctional vinyl monomers {divinylbenzene, ethylene di(meth)acrylate, trimethylolpropane tri(meth) acrylate, and polyethylene glycol (degree of polymerization: 14) di(meth)acrylate}; allyl alcohol; adducts of alkylene oxides (having 2 to 4 carbon atoms) to allylalcohol {adducts of 2 mol propylene oxide to allyl alcohol, and the like}; 2-buten-1-ol; (2-hydroxyethyl) (meth)acrylate; adducts of alkylene oxides (having 2 to 4 carbon atoms) to (2-hydroxyethyl) (meth)acrylate {an adduct of 4 mol propylene oxide to (2-hydroxyethyl) (meth)acrylate, and the like}; butadiene; isoprene; vinyl chloride; vinylidene chloride; and vinyl acetate.

Although these may be used alone or two or more of them may be used together, it is preferred to use at least one monomer having a polyoxyalkylene group {e.g., (meth) acrylates of adducts of alkylene oxide (having 2 to 4 carbon atoms) to alcohols having 1 to 18 carbon atoms; polyethylene glycol (degree of polymerization: 14) di(meth)acrylate; adducts of alkylene oxide (having 2 to 4 carbon atoms) to allyl alcohol; and adducts of alkylene oxides (having 2 to 4 carbon atoms) to (2-hydroxyethyl) (meth)acrylate}.

(Meth)acrylic acid represents acrylic acid and/or methacrylic acid, (meth)acrylonitrile represents acrylonitrile and/or methacrylonitrile, and (meth)acrylate represents acrylate and/or methacrylate.

The synthetic resin fine particles (Df1) containing an ethylenically unsaturated monomer (m1) as a constitutional unit can be obtained by polymerization by a publicly known method. These may be reacted in the base oil (E) and then useddirectly, or alternatively particles prepared beforehand by performing reaction and the base oil (E) may be mixed.

Examples of the monomer for polycondensation and polyaddition (m2) include publicly known monomers for polycondensation and polyaddition, and specifically include a polyisocyanate (m21), a polyamine (m22), a polyol (m23), and a polycarboxylic acid (m24).

Examples of the polyisocyanate (m21) include diisocyanates having 8 to 16 carbon atoms {hexamethylene diisocyanate, tolylene diisocyanate, isophorone diisocyanate, 4-4'-methylenebis(cyclohexylisocyanate), and the like} and their modified products {trimethylolpropane adducts of diisocyanate, biuret condensates, isocyanurate condensates, and the like}.

Examples of the polyamine (m22) include polyamines having 1 to 6 carbon atoms, and specifically include urea, melamine, ethylenediamine, hexamethylenediamine, diethylenetriamine, and triethylenetetramine.

Examples of the polyol (m23) include polyhydric alcohols having 2 to 6 carbon atoms {ethylene glycol, propylene glycol, butylene glycol, glycerol, diglycerol, pentaerythritol, and the like}; and adducts prepared by adding 1 to 50 mol of alkylene oxide having 2 to 4 carbon atoms, per one hydroxyl group, to such polyhydric alcohols {ethylene oxide adducts, propylene oxide adducts, butylene oxide adducts, ethylene oxide/propylene oxide block adducts, or propylene oxide/butylene oxide block adducts of polyhydric alcohols, and the like}.

Examples of the polycarboxylic acid (m24) include polycarboxylic acids having 4 to 14 carbon atoms, and specifically include terephthalic acid, isophthalic acid, naphthalene dicarboxylic acid, biphenyldicarboxylic acid, oxalic acid, succinic acid, adipic acid, sebacic acid, fumaric acid, maleic acid, itaconic acid, and dimer acid.

Examples of the synthetic resin fine particles (Df2) containing a monomer for polycondensation and polyaddition (m2) as a constitutional unit include polyureas, polyurethanes, and polyesters containing the above-mentioned monomer as a constitutional unit, and the fine particles can be produced by performing reaction by a publicly known method. These may be reacted in the base oil (E) and then used directly, or alternatively particles prepared beforehand by performing reaction and the base oil (E) may be mixed.

The synthetic resin fine particles (Df) can be obtained from the market, and for example, the following commercial products can be used.

ULTIFLOW FS-7301 (manufactured by Sanyo Chemical Industries, Ltd., a dispersion of an ethylenically unsaturated monomer-copolymerized product in a polyether, "ULTIFLOW" is a registered trademarks of this company), DAIMICBEAZ UCN-8070CM Clear (manufactured by Dainichiseika Color & Chemicals Mfg. Co., Ltd., polyurethane beads, "DAINAMICBEAZ" is a registered trademarks of this company), and TAFTIC F-120 and F-167 (manufactured by Toyobo Co., Ltd., a dispersion of an ethylenically unsaturated monomer-copolymerized product in water; "TAFTIC" is a registered trademark of this company)

When the nucleating agent (D) and the base oil (E) that is liquid at 25° C. are used for the oil phase (A), the content (% by weight) of the nucleating agent (D) is preferably 0.01 to 20, more preferably 0.1 to 18, particularly preferably 0.3 to 16, and most preferably 0.5 to 15 based on the weight of the nucleating agent (D) and the base oil (E) that is liquid at 25° C.

In this case, the content (% by weight) of the base oil (E) that is liquid at 25° C. is preferably 80 to 99.99, more preferably 82 to 99.9, particularly preferably 84 to 99.7, and most preferably 85 to 99.5 based on the weight of the nucleating agent (D) and the base oil (E) that is liquid at 25° C.

In the case of containing the hydrophobic silica (Da), it is preferred to disperse the hydrophobic silica (Da) in the base oil (E) that is liquid at 25° C. by using an emulsifying and dispersing machine (a bead mill, a Disper Mill, a homogenizer or a Gaulin Homogenizer, an ultrasonic disperser, and the like).

In the case of containing the fatty acid amide (Db), the petroleum wax (Dc), the synthetic wax (Dd), and/or the vegetable wax (De), it is preferred to disperse the fatty acid amide (Db), the petroleum wax (Dc), the synthetic wax (Dd), and/or the vegetable wax (De) in the base oil (E) that is liquid at 25° C. by the following production method.

A method including:
a dissolving step (di) of obtaining a solution by dissolving the fatty acid amide (Db), the petroleum wax (Dc), the synthetic wax (Dd), and/or the vegetable wax (De) while heating and stirring the fatty acid amide (Db), the petroleum wax (Dc), the synthetic wax (Dd), and/or the vegetable wax (De) together with a part of the base oil (E) that is liquid at 25° C.,
a mixing step (dii) of obtaining a mixture by charging the solution into the rest of the base oil (E) that is liquid at 25° C. while stirring that rest, and
a dispersing step (diii) of subjecting the mixture to homogenization treatment to obtain a dispersion liquid of the fatty acid amide (Db), the petroleum wax (Dc), the synthetic wax (Dd), and/or the vegetable wax (De).

The heating and stirring temperature (° C.), which is not limited as long as the fatty acid amide (Db), the petroleum wax (Dc), the synthetic wax (Dd), and/or the vegetable wax (De) can be dissolved, is preferably 100 to 180, more preferably 110 to 160, particularly preferably 120 to 150, and most preferably 125 to 145.

The heating and stirring time, which is not limited as long as the fatty acid amide (Db), the petroleum wax (Dc), the synthetic wax (Dd), and/or the vegetable wax (De) can be dissolved, is preferably adjusted to be as short as possible in order to prevent oxidation, evaporation, and the like of the base oil (E).

The heating and stirring may be carried out under sealing (and optionally under pressure) or alternatively under opening.

In the mixing step (dii) is preferred to heat and stir the solution also during the time period of charging the solution and keep the fatty acid amide (Db), the petroleum wax (Dc), the synthetic wax (Dd), and/or the vegetable wax (De) dissolved.

The homogenization treatment is not limited as long as it can homogenize the fatty acid amide (Db), the petroleum wax (Dc), the synthetic wax (Dd), and/or the vegetable wax (De), and it is preferred to perform the homogenization treatment by using an emulsifying and dispersing machine (a bead mill, a Disper Mill, a homogenizer or a Gaulin Homogenizer, an ultrasonic emulsifying machine, and the like).

In the case of containing the synthetic resin fine particles (Df), is preferred to disperse the synthetic resin fine particles (Df) in the base oil (E) that is liquid at 25° C. by using an emulsifying and dispersing machine (a bead mill, a Disper Mill, a homogenizer or a Gaulin Homogenizer, an ultrasonic disperser, and the like), Regardless of whether or not the oil phase (A) contains the nucleating agent (D), the oil phase may contain a surfactant (F), a metallic soap (G), and/or an oil-soluble polymer (H), and the like.

The surfactant (F) includes anionic surfactants, nonionic surfactants, and their mixtures.

Nonionic surfactants having an HLB of 3.5 to 20 can be used, and ones having an HLB of 3.6 to 19 are preferred, ones having an HLB of 3.7 to 18 are more preferred, and ones having an HLB of 4 to 17 are most preferred.

Examples of the nonionic surfactants include sorbitan fatty acid esters, ethylene oxide adducts of sorbitan fatty acid esters, polyoxyethylene polyoxypropylene block polymers, polyoxyethylene alkyl aryl ethers, ethylene oxide adducts of vegetable oils, fatty acid esters of polyoxyethylene, polyoxyethylene alkyl ethers, glycerol fatty acid esters, ethylene oxide adducts of glycerol fatty acid esters, and modified silicones.

Examples of the sorbitan fatty acid esters include esters of sorbitan with fatty acids having 12 to 22 carbon atoms, and specifically include sorbitan monolaurate (HLB 8.6, e.g., NONION LP-20R; NOF Corporation), sorbitan monopalmitate (HLB 6.7, e.g., NONION PP-40R pellet; NOF Corporation), sorbitan monostearate (HLB 4.7, e.g., NONION SP-60R pellet; NOF Corporation), sorbitan monooleate (HLB 4.3, e.g., NONION OP-80R; NOF Corporation), sorbitan trioleate (HLB 1.8, e.g., NONION OP-85R; NOF Corporation), and sorbitan monooleate (HLB 4.3, e.g., IONET S-80; Sanyo Chemical Industries, Ltd., "IONET" is a registered trademark of this company).

Examples of the ethylene oxide adducts of sorbitan fatty acid esters include ethylene oxide (1 to 40 mol) adducts of sorbitan fatty acid esters, and specifically include polyoxyethylene sorbitan monolaurate (HLB 16.7, e.g., NONION LT-221; NOF Corporation), polyoxyethylene sorbitan monostearate (HLB 15.7, e.g., NONION ST-221; NOF Corporation), and polyoxyethylene sorbitan monooleate (HLB 15.7, e.g., NONION OT-221; NOF Corporation).

Examples of the polyoxyethylene polyoxypropylene block polymers include copolymers of 5 to 200 mol of ethylene oxide and 5 to 200 mol of propylene oxide, and specifically include a polyoxyethylene (25 mol)-polyoxypropylene (30 mol) block polymer (e.g., NEWPOL PE-64; Sanyo Chemical Industries, Ltd.; "NEWPOL" is a registered trademark of this company) and a polyoxyethylene (48 mol)-polyoxypropylene (35 mol) block polymer (e.g., NEWPOL PE-75; Sanyo Chemical Industries, Ltd.).

Examples of the polyoxyethylene alkyl aryl ethers include polyoxyethylene ethers of alkylaryls having an alkyl group having 6 to 18 carbon atoms, and specifically include polyoxyethylene (4 mol) nonyl phenol ether (e.g., NONIPOL 40; Sanyo Chemical Industries, Ltd.; "NONIPOL" is a registered trademark of this company) and polyoxyethylene (10 mol) nonyl phenol ether (e.g., NONIPOL 100; Sanyo Chemical Industries, Ltd.).

Examples of the ethylene oxide adducts of vegetable oils include ethylene oxide (1 to 200 mol) adducts of vegetable oils, and specifically include an ethylene oxide adduct of castor oil (e.g., UNIOX HC-40; NOF Corporation; "UNIOX" is a registered trademark of this company).

Examples of the fatty acid esters of polyoxyethylene include monoesters and diesters of polyoxyethylene having a number average molecular weight of 200 to 4000 with a fatty acid having 6 to 22 carbon atoms, and specifically include diesters of polyoxyethylene glycol having a number average molecular weight of 600 with oleic acid (e.g., IONET DO-600; Sanyo Chemical Industries, Ltd.) and monoesters of polyoxyethylene glycol having a number average molecular weight of 600 with oleic acid (e.g., IONET MO-600; Sanyo Chemical Industries, Ltd.).

Examples of the polyoxyethylene alkyl ethers include oxyethylene (1 to 100 mol) adducts of alkanols having 6 to 22 carbon atoms, and specifically include NAROACTY CL-40 (HLB 8.9, Sanyo Chemical Industries, Ltd., "NAROACTY" is a registered trademark of this company) and NAROACTY CL-100 (HLB 13.3, Sanyo Chemical Industries, Ltd.).

Examples of the glycerol fatty acid esters include monoesters of a fatty acid having 6 to 22 carbon atoms with glycerol, and specifically include glycerol monostearate (e.g. MONOGLY MD, HLB 5.5, NOF Corporation).

Examples of the ethylene oxide adducts of glycerol fatty acid esters include ethylene oxide (1 to 100 mol) adducts of glycerol fatty acid esters, and specifically include an ethylene oxide adduct of glycerol coconut oil fatty acid ester (e.g. UNIGLY MK-207, HLB 13.0, NOF Corporation, and "UNIGLY" is a registered trademark of this company).

Examples of the modified silicone include ones resulting from substituting some of the methyl groups of a dimethylsiloxane with an alkoxypolyoxyalkyleneoxypropyl group (the alkoxy has 1 to 6 carbon atoms; the alkylene has 2 to 3 carbon atoms; the degree of polymerization is 2 to 50; and the weight of the oxyethylene group is equal to or more than 20% by weight of the overall weight of the oxyalkylene group), an alkoxypolyoxyalkylene group (the alkoxy has 1 to 6 carbon atoms; the alkylene has 2 to 3 carbon atoms; the degree of polymerization is 2 to 50; and the weight of the oxyethylene group is equal to or more than 20% by weight of the overall weight of the oxyalkylene group), or the like.

Among them, preferred are sorbitan fatty acid esters, ethylene oxide adducts of sorbitan fatty acid esters, polyoxyethylene alkyl ether, monoesters and diesters of polyoxyethylene with a fatty acid, glycerol fatty acid esters, and ethylene oxide adducts of glycerol fatty acid esters.

Examples of the anionic surfactants include salts of alkylarylsulfonic acids, salts of alkyl biphenyl ether disulfonic acids, salts of polyoxyethylene alkyl sulfonic acid esters, and salts of polyoxyethylene alkyl phosphoric acid esters.

The salts of alkylarylsulfonic acids include salts of alkylarylsulfonic acids having 6 to 18 carbon atoms, including salts of dodecylbenzenesulfonic acid.

The salts, which are not particularly limited, include salts of alkali metals (e.g., sodium and potassium), salts of alkaline earth metals (e.g., calcium and magnesium), ammonium salts, and salts of amines having 1 to 18 carbon atoms (e.g., triethanolamine, trimethylamine, and propylamine) (the same is applied also hereinafter).

Examples of the salts of alkyl diphenyl ether sulfonic acids include salts of alkyl diphenyl ether disulfonic acids having an alkyl group having 6 to 18 carbon atoms, including salts of dodecyl diphenyl ether disulfonic acid.

Examples of the salts of polyoxyethylene alkyl sulfuric acid esters include salts of polyoxyethylene alkyl sulfuric acid esters having 6 to 22 carbon atoms, and specifically include salts of polyoxyethylene lauryl sulfuric acid ester.

Examples of the salts of polyoxyethylene alkyl phosphoric acid esters include polyoxyethylene alkyl phosphoric acid esters having 6 to 22 carbon atoms, and specifically include salts of polyoxyethylene stearyl phosphoric acid ester.

Among them, the salts of alkylarylsulfonic acids and the salts of alkyl diphenyl ether disulfonic acids are preferred, salts of dodecylbenzenesulfonic acid and salts of dodecyldiphenyl ether disulfonic acid are more preferred, and calcium dodecylbenzenesulfonate and calcium dodecyldiphenyl ether disulfonate are particularly preferred.

In the case of containing the surfactant (F), the content (% by weight) of the surfactant (F) is preferably 0.01 to 20, more preferably 0.02 to 19, particularly preferably 0.03 to 18, and most preferably 0.04 to 16 based on the weight of the oil phase (A).

When the surfactant (F) is contained and the hydrophobic silica (Da) is contained in the oil phase (A), the content (% by weight) of a water-soluble surfactant among the surfactant (F) (hereinafter referred to as aqueous surfactant (Fs)) is preferably 0.01 to 2, more preferably 0.01 to 1.9, particularly preferably 0.01 to 1.8, and most preferably 0.01 to 1.6 based on the weight of the oil phase (A).

The water-soluble surfactant (Fs) means, of surfactants (F), one at least 1 g of which is dissolved completely in 100 g of ion-exchanged water at 25° C. and 1 atm to be uniform and transparent.

Examples of the metallic soap (G) include salts of fatty acids having 12 to 22 carbon atoms with metals (alkaline earth metal, aluminum, manganese, cobalt, lead, chromium, copper, iron, nickel, and the like), and specifically include aluminum stearate, calcium stearate, zinc laurate, and magnesium behenate.

In the case of containing the metallic soap (G) in the oil phase (A), the content (% by weight) of the metallic soap (G) is preferably 0.1 to 50, more preferably 0.5 to 45, particularly preferably 1 to 40, and most preferably 2 to 35 based on the weight of the oil phase (A).

As the oil-soluble polymer (H), a polymer that can be dissolved uniformly in the base oil (E) that is liquid at 25°

C., and examples thereof include an alkyl (meth)acrylate copolymer, a copolymer of an α-olefin and a (meth)acrylic acid alkyl ester, petroleum resin, liquid rubber, and a block copolymer containing a polydiene block and a polystyrene block. The oil-soluble polymer (H) can be obtained from the market easily and exemplary trade names thereof include SANELIS 702, 823, and 934 (poly(meth)acrylate-based polymers, Sanyo Chemical Industries, Ltd., "SANELIS" is a registered trademark of this company), ACLUBE 136, 728, and 812 (poly(meth)acrylate-based polymers, Sanyo Chemical Industries, Ltd., "ACLUBE" is a registered trademark of this company), ARKON M-135 and P-125 (petroleum resins, Arakawa Chemical Industries, Ltd., "ARKON" is a registered trademark of this company), KURAPRENE LIR30, LIR310, and L-SBR (liquid rubbers, Kuraray Co., Ltd., "KURAPRENE" is a registered trademark of this company), and SEPTON (a block copolymer including a hydrogenated polydiene block and a polystyrene block, Kuraray Co., Ltd., "SEPTON" is a registered trademark of this company).

In the case of containing the oil-soluble polymer (H), the content (% by weight) of the oil-soluble polymer (H) is preferably 0.1 to 50, more preferably 0.5 to 48, particularly preferably 0.8 to 46, and most preferably 1 to 45 based on the weight of the base oil (E) that is liquid at 25° C.

In the case of containing the surfactant (F), the surfactant (F) may be charged in any step as long as it can be mixed in the oil phase (A) uniformly.

In the case of using the oil-soluble polymer (H), the oil-soluble polymer (H) may be charged in any step as long as it can be mixed in the oil phase (A) uniformly.

In the case of using the metallic soap (G), it is preferred to use it by the following methods.

<Method 1>

A method of heating and mixing the metallic soap (G) and a part of the base oil (E) that is liquid at 25° C. to dissolve the metallic soap (G) uniformly, then cooling the solution to 40° C. or lower to form a mixed liquid, and mixing the mixed liquid with the rest of the base oil (E), and the like to form the oil phase (A).

<Method 2>

A method of heating and mixing the metallic soap (G), a part of the base oil (E) that is liquid at 25° C., and a part or the whole of the surfactant (F) to dissolve the metallic soap (G) uniformly, then cooling the solution to 40° C. or lower to form a mixed liquid, and mixing the mixed liquid with the rest of the base oil (E), and the like to form the oil phase (A).

<Method 3>

A method of heating and mixing the metallic soap (G) and the base oil (E) that is liquid at 25° C., and the like to dissolve the metallic soap (G) uniformly, and then cooling the solution to 40° C. or lower to form the oil phase (A).

The water phase (B) includes water (I) as an essential constituent, and examples of the water (I) include tap water, industrial water, deionized water, and distilled water. The water phase (B) may contain a publicly known thickener, a publicly known antiseptic (Dictionary of Antibacterial and Antifungal Agents, 1st Ed., pp. 1-32, published by The Society for Antibacterial and Antifungal Agents, Japan, 1986, etc.) and/or an antifreezing agent in addition to the water (I).

Examples of the thickener include xanthan gum, locust bean gum, guar gum, carrageenan, alginic acid and a salt thereof, tragacanth gum, magnesium aluminum silicate, bentonite, synthetic hydrous silicic acid, and a synthetic polymer type thickener containing a carboxyl group (exemplary trade names include SN-Thickener 636 and SN-Thickener 641; SAN NOPCO Ltd.), and an association type thickener containing a polyoxyethylene chain (exemplary trade names include SN-Thickener 625N and SN-Thickener 665T).

Examples of the antifreezing agent include ethylene glycol, propylene glycol, and glycerol.

Examples of the antiseptic include formalin and 5-chloro-2-methyl-4-isothiazolin-3-one.

The content (% by weight) of the oil phase (A) is preferably 10 to 60, more preferably 12 to 56, particularly preferably 15 to 54, and most preferably 20 to 50 based on the weight of the oil phase (A), the water phase (B), and the hydrophilic fumed silica (C). In such ranges, defoaming properties (initial defoaming property and defoaming durability) and stability (emulsion stability) are further improved.

The content (% by weight) of the water phase (B) is preferably 34 to 89.9, more preferably 39 to 87.7, particularly preferably 41 to 84.5, and most preferably 44 to 79 based on the weight of the oil phase (A), the water phase (B), and the hydrophilic fumed silica (C). In such ranges, the defoaming properties (initial defoaming property and defoaming durability) and the stability (emulsion stability) are further improved.

The content (% by weight) of the hydrophilic fumed silica (C) is preferably 0.1 to 6, more preferably 0.3 to 5.5, particularly preferably 0.5 to 5, and most preferably 1 to 4.5 based on the weight of the oil phase (A), the water phase (B), and the hydrophilic fumed silica (C). In such ranges, the defoaming properties (initial defoaming property and defoaming durability) and the stability (emulsion stability) are further improved.

The median diameter (d50, by number) (μm) of emulsion particles having the oil phase (A) and the hydrophilic fumed silica (C) is preferably 0.3 to 25, more preferably 0.5 to 24, particularly preferably 0.8 to 23, and most preferably 1 to 22. In such ranges, the defoaming properties are further improved.

The median diameter (d50, by number) of the emulsion particles including the oil phase (A) and the hydrophilic fumed silica (C) is measured in the following way by using a laser diffraction/scattering type particle size distribution analyzer {e.g., Partica LA-950V2 (flow cell type, the index of refraction of the dispersoid=1.45, the index of refraction of the dispersing medium=1.33, the number of iterations: 15), HORIBA, Ltd.}.

<Measuring Method>

Blank measurement is performed by putting ion-exchanged water into a flow cell and circulating the water (circulation strength 5). About 10 mL of ion-exchanged water is put into a 100 mL glass beaker, and then a few drops of a sample to be measured (an oil-in-water emulsion defoaming agent) are added and mixed until uniform, so that a dispersion liquid is prepared. The dispersion liquid is added gradually to the flow cell and measurement is carried out with the transmitted light intensity adjusted properly (the transmitted light intensity of blue LED to 80 to 90% or the transmitted light intensity of red LED to 70 to 90%).

The measured value is calculated by subtracting the value of the blank measurement.

The median diameter (d50, by number) of the emulsion particles can be adjusted by the weight ratio (A/C) of the oil phase (A) to the hydrophilic fumed silica (C), the viscosity of the oil phase (A), the viscosity of the water phase (B), the dispersion method in the emulsifying and dispersing step, and the like. The larger the weight ratio (A/C) of the oil phase (A) to the hydrophilic fumed silica (C) is, the smaller the median diameter (d50, by number) of the emulsion particles tends to be. The lower the viscosity of the oil phase (A) is or the higher the viscosity of the water phase (B) is, the smaller the median diameter (d50, by number) of the emulsion particles tends to be. If emulsification and dispersion is performed by applying stronger shear in the emulsifying and dispersing step, the median diameter (d50, by number) of the emulsion particles tends to be smaller.

The weight ratio (A/C) of the oil phase (A) to the hydrophilic fumed silica (C) is preferably from 2 to 100, more preferably from 4 to 90, and particularly preferably from 6 to 80.

The defoaming agent of the present invention can be produced by the following production methods (1) to (3), or the like.

<Production Method (1)>

Method (1) including:

a dispersing and disaggregating step (i) of obtaining a dispersion liquid (BC1) having a median diameter (d50, by number) of hydrophilic fumed silica of 20 to 300 nm while dispersing and disaggregating the hydrophilic fumed silica (C) in the water phase (B), and an emulsifying and dispersing step (ii) of emulsifying and dispersing the dispersion liquid (BC1) prepared in the dispersing and disaggregating step (i) and the oil phase (A) to obtain an oil-in-water emulsion defoaming agent.

<Production Method (2)>

Method (2) including:

a dispersing and disaggregating step (iii) of obtaining a dispersion liquid (BC2) having a median diameter (d50, by number) of hydrophilic fumed silica of 20 to 300 nm while dispersing and disaggregating the hydrophilic fumed silica (C) in a part of the water phase (B), a mixing and dispersing step (iv) of mixing and dispersing the oil phase (A) and the rest of the water phase (B) to obtain a mixed dispersion liquid (AB), and an emulsifying and dispersing step (v) of emulsifying and dispersing the mixed dispersion liquid (AB) and the dispersion liquid (BC2) to obtains an oil-in-water emulsion defoaming agent.

The median diameter (d50, by number) of the hydrophilic fumed silica in the dispersion liquids (BC1) and (BC2) is preferably 20 to 300 nm, more preferably 24 to 250 nm, particularly preferably 28 to 200 nm, and most preferably 32 to 150 nm.

<Production Method (3)>

Method (3) including:

a dispersing and disaggregating step (vi) of obtaining a dispersion liquid (AC) of hydrophilic fumed silica while dispersing and disaggregating the hydrophilic fumed silica (C) in the oil phase (A), and an emulsifying and dispersing step (vii) of emulsifying and dispersing the dispersion liquid (AC) and the water phase (B) to obtains an oil-in-water emulsion defoaming agent.

In the steps of dispersing and disaggregating the hydrophilic fumed silica (C) in the water phase (B) (step (i) and step (iii)), although there are no limitations as long as the hydrophilic fumed silica (C) can be dispersed and disaggregated, it is preferred to perform dispersion and disaggregation using an emulsifying and dispersing machine (a bead mill, a Disper Mill, a homogenizer, a Gaulin Homogenizer, an ultrasonic disperser, and the like).

In the step of dispersing and disaggregating the hydrophilic fumed silica (C) in the oil phase (A) (step (vi)), although there are no limitations as long as the hydrophilic fumed silica (C) can be dispersed and disaggregated, it is preferred to perform dispersion and disaggregation using an emulsifying and dispersing machine (a bead mill, a Disper Mill, a homogenizer, a Gaulin Homogenizer, an ultrasonic disperser, and the like).

In the emulsifying and dispersing steps (ii), (v), and (vii), although there are no limitations with respect to the apparatus and the like to be used as long as the oil phase (A) can be emulsified and dispersed in the water phase (B), emulsification and dispersion may be performed using an emulsifying and dispersing machine (e.g., a Disper Mill, a homogenizer, and an ultrasonic emulsifying machine).

The defoaming agent of the present invention is effective for an aqueous foamable liquid and can be used as, for example, a defoaming agent for paints (water-based paint and the like), and a defoaming agent for various production processes (a paper-making process, a fermentation process, an incubation process, a waste water treatment process, a monomer stripping process, a polymer polymerization process, and the like).

Among them, the defoaming agent of the present invention is suited as a defoaming agent for paints and a defoaming agent for drainage treatment, more suited as a defoaming agent for water-based paints, and it is best-suited as a defoaming agent for emulsion paints out of water-based paints (paint for water-based building exterior decoration, paint for building interior decoration, water-based ink, paint of paper coating, and the like).

Examples of the binder contained in the emulsion paint include vinyl acetate resin, acrylic resin, styrene resin, halogenated olefin resin, urethane resin, silicone resin, and fluorine atom-containing silicone resin, and the defoaming agent of the present invention is effective for any one.

The method for adding the defoaming agent of the present invention, in the case of applying it to a paint, includes (1) a method of adding it at the time of feeding a mill base, (2) a method of adding it at the time of pre-kneading for uniformly dispersing a pigment, (3) a method of adding it at the time of dispersing a pigment, (4) a method of adding it at the time of blending to charge and mix the remaining raw materials, and/or (5) a method of adding it after paint preparation. Moreover, when applying the defoaming agent to various production processes, the method may be any of the methods of adding it (1) at the same time as the feed of raw materials, (2) before heating and/or pressure reduction treatment, and/or (3) during a final finishing step or the like. For example, when applying to a drainage treatment process, it may be added to an inflow of the drainage (before an aerating tank), before separation (before a precipitation tank), to finishing (discharge), or the like.

When the defoaming agent of the present invention is applied to various production processes, the added amount (% by weight) thereof is preferably 0.0001 to 3, more preferably 0.001 to 2.7, particularly preferably 0.005 to 2.3, and most preferably 0.01 to 2 based on the weight of the aqueous foamable liquid. When the defoaming agent of the present invention is applied to a paint, the added amount (% by weight) thereof is preferably 0.05 to 3, more preferably 0.1 to 2.7, particularly preferably 0.2 to 2.3, and most preferably 0.3 to 2.0 based on the weight of the paint.

Moreover, when the defoaming agent of the present invention is applied to emulsion paint, which is best suited, the added amount (% by weight) thereof is preferably 0.05 to 3, more preferably 0.1 to 2.7, particularly preferably 0.2 to 2.3, and most preferably 0.3 to 2 based on the weight of the paint.

EXAMPLES

The present invention will be described below in more detail by way of Examples, but the present invention is not limited to them. Unless otherwise stated, part (s) and % mean part (s) by weight and % by weight, respectively. Of surfactants, one that is soluble in water is denoted as a water-soluble surfactant, and one that is denoted merely by surfactant represents a surfactant other than a water-soluble surfactant. Unless otherwise stated, examples were carried out at 25 to 30° C.

The median diameter (d50, by number) (μm) of the hydrophilic fumed silica (C) in the dispersion liquids (BC1 and BC2) of hydrophilic fumed silica was determined by performing blank measurement in which a laser diffraction/scattering type particle size distribution analyzer Partica LA-950V2 (flow cell type, the index of refraction of the dispersoid=1.45, the index of refraction of the dispersing medium=1.33, the number of iterations: 15, HORIBA, Ltd.) was used, water was used as the dispersing medium, water was put into the flow cell, and the water was circulated therein at a circulation strength of 5, subsequently performing measurement in which an appropriate amount of a sample to be measured {the dispersion liquid (BC1 or BC2)} was added to the flow cell, and then calculating the median diameter by subtracting the value obtained in the blank measurement from the measured value obtained with the sample.

The amount of the sample {the dispersion liquid of hydrophilic fumed silica (BC1 or BC2)} to be measured and put into the flow cell was adjusted so that the transmittance of blue LED light was 88 to 92%; since a larger amount of the sample to be measured provided a lower transmittance, the transmittance was adjusted to fall within that range through the adjustment of the amount of the sample to be measured or the amount of the dispersing medium when the transmittance was out of the range.

Preparation Example (1) of Oil Phase

In a container capable of heating, stirring, and cooling, 50 parts of a nucleating agent (db1) {ALFLOW H-50S, manufactured by NOF Corporation, ethylene bis-stearylamide}, 300 parts of a base oil (e1) {mineral oil, COSMO PURE-SPIN G, manufactured by Cosmo Oil Lubricants Co., Ltd.}, and 10 parts of a surfactant (fa1) {70% methanol solution of calcium dodecylbenzenesulfonate, TAYCAPOWER BC2070M, manufactured by Tayca Corporation; "TAYCA-POWER" is a registered trademark of this company} were heated to 145° C. under heating and stirring, and then heating and stirring were continued for additional 15 minutes at that temperature, so that a solution (1) was obtained.

Subsequently, 450 parts of a base oil (e2) {mineral oil, COSMO PURESPIN E, manufactured by Cosmo Oil Lubricants Co., Ltd.} and 200 parts of a base oil (e3) {mineral oil, STANOL 40, manufactured by Exxon Mobil Corporation} were adjusted to 15° C. and cooled and stirred to prepare a receiving liquid (1). While the receiving liquid (1) was cooled and stirred, the solution (1) was poured in small portions into the receiving liquid (1) and stirred for 15 minutes, affording a dispersion liquid (1). The temperature of the mixture (dispersion liquid) during the addition of the solution and the temperature of the mixture after the addition were 15 to 45° C.

The dispersion liquid (1) was cooled to a temperature of 40° C. or lower and stirred, and was subjected to homogenization treatment at 3500 psi (24.1 MPa) with a Gaulin Homogenizer at a temperature of 40° C. or lower, affording an oil phase (1).

Preparation Examples 2 to 7 of Oil Phase

Oil phases (2) to (7) were obtained in the same way as in Preparation Example (1) of Oil Phase except that the components and the use amount of the solution (1) were changed as shown in Table 1 and the components of the receiving liquid (1) were changed as shown in Table 2. The oil phase (X) was prepared using the solution (X) and the receiving liquid (X) {"X" is a number of from 2 to 7, and an identical number is given to a series of preparation example, oil phase, solution, and receiving liquid}.

TABLE 1

|  | Solution (2) | Solution (3) | Solution (4) | Solution (5) | Solution (6) | Solution (7) |
|---|---|---|---|---|---|---|
| Nucleating agent (da1) | 5 |  |  |  |  |  |
| Nucleating agent (da3) |  |  |  | 30 |  |  |
| Nucleating agent (da4) |  |  |  | 30 | 5 | 50 |
| Nucleating agent (db1) |  |  |  |  |  | 150 |
| Nucleating agent (db2) | 15 |  |  |  |  |  |
| Nucleating agent (db3) |  |  | 30 |  |  |  |
| Nucleating agent (db4) |  |  |  | 10 |  |  |
| Nucleating agent (dc1) | 10 |  |  |  |  |  |
| Nucleating agent (dd1) |  | 35 |  |  |  |  |
| Base oil (e1) | 400 |  |  | 300 |  | 300 |
| Base oil (e7) |  | 100 |  |  |  |  |
| Base oil (e9) |  | 350 |  |  |  |  |
| Base oil (e11) |  |  | 300 |  |  |  |
| Base oil (e15) |  |  |  |  | 100 |  |
| Base oil (e20) |  |  |  |  | 200 |  |
| Surfactant (fn1) |  |  |  |  | 15 |  |
| Surfactant (fn2) |  |  |  |  | 20 |  |
| Surfactant (fn3) |  |  |  |  | 15 |  |
| Surfactant (fa1) |  |  | 30 |  |  | 100 |
| Surfactant (fa2) |  |  |  | 50 |  |  |
| Surfactant (fs1) |  | 2 |  |  |  |  |
| Surfactant (fs2) | 10 |  |  |  |  |  |
| Metallic soap (g1) |  |  |  | 20 |  |  |

TABLE 2

|  | Receiving liquid (2) | Receiving liquid (3) | Receiving liquid (4) | Receiving liquid (5) | Receiving liquid (6) | Receiving liquid (7) |
|---|---|---|---|---|---|---|
| Nucleating agent (da2) |  |  | 50 |  |  |  |
| Nucleating agent (da4) |  | 10 |  |  |  |  |
| Base oil (e1) |  |  |  | 400 |  | 550 |
| Base oil (e2) |  |  |  | 210 |  |  |
| Base oil (e4) | 60 |  |  |  |  |  |

TABLE 2-continued

|  | Receiving liquid (2) | Receiving liquid (3) | Receiving liquid (4) | Receiving liquid (5) | Receiving liquid (6) | Receiving liquid (7) |
|---|---|---|---|---|---|---|
| Base oil (e5) | 50 | | | | | |
| Base oil (e6) | 460 | | | | | |
| Base oil (e8) | | 50 | | | | |
| Base oil (e10) | | 455 | | | | |
| Base oil (e12) | | | 450 | | | |
| Base oil (e13) | | | 100 | | | |
| Base oil (e14) | | | 40 | | | |
| Base oil (e20) | | | | | | 695 |

Nucleating agent (da1): Hydrophobic silica, Nipsil SS-100, manufactured by Tosoh Silica Corporation Nucleating agent (da2): Hydrophobic silica, AEROSIL R972, manufactured by Nippon Aerosil Co., Ltd.

Nucleating agent (da3): Hydrophobic silica, SIPERNAT D10, manufactured by Degussa Japan Co., Ltd.

Nucleating agent (de4): Hydrophobic silica, Nipsil G-0251, manufactured by Tosoh Silica Corporation Nucleating agent (db2): Ethylene bisoleylamide, ALFLOW AD-281F, manufactured by NOF Corporation Nucleating agent (db3): Stearylamide, Amide AP-1, manufactured by Nippon Kasei Chemical Co., Ltd.

Nucleating agent (db4): Hexamethylene bisstearylamide, ITOHWAX J-630, manufactured by Itoh Oil Chemicals Co., Ltd.

Nucleating agent (dc1): Microcrystalline wax, Hi-Mic-2095, manufactured by Nippon Seiro Co., Ltd.

Nucleating agent (dd1): Fischer-Tropsch wax, FT-105, manufactured by Nippon Seiro Co., Ltd.

Nucleating agent (dd2): Oxidized polyethylene wax, Epolene E-10, manufactured by Eastman Chemical Company Nucleating agent (dd3): Alcohol-modified wax, OX-3405, manufactured by Nippon Seiro Co., Ltd.

Nucleating agent (de1): Carnauba wax, Carnauba Wax No. 1, manufactured by S. Kato & Co.

Nucleating agent (df1): Synthetic resin fine particle, product prepared in accordance with Example 1 of JP-A-2009-7506 {copolymer having as constitutional units (styrene)/(acrylonitrile)/(divinylbenzene)/(reactive dispersant obtained by jointing a propylene oxide adduct of glycerol and 2-hydroxymethyl methacrylate with tolylene diisocyanate (TDI))/(polyoxyalkylene ether prepared by adding propylene oxide (PO) to allyl alcohol) (particle diameter: 0.7 μm)}

Base oil (e4): Polyoxyethylene (5 mol) polyoxypropylene (30 mol) (HLB=2.3), NEWPOL PE-61, manufactured by Sanyo Chemical Industries, Ltd.

Base oil (e5): Polyoxypropylene (80 mol) adduct of sucrose (HLB=1.4)

Base oil (e6): Propylene oxide (43 mol) adduct of glycerol (HLB=0.3, SANNIX GP-3000, manufactured by Sanyo Chemical Industries, Ltd.; "SANNIX" is a registered trademark of this company)

Base oil (e7): Ethylene oxide (10 mol)/propylene oxide (68 mol) block adduct of trimethylolpropane (HLB=2.0), NEWPOL TL-4500N, manufactured by Sanyo Chemical Industries, Ltd.

Base oil (e8): Propylene oxide (9 mol) adduct of glycerol (HLB=1.5), NEWPOL GP-600, manufactured by Sanyo Chemical Industries, Ltd.

Base oil (e9): Polyoxypropylene (40 mol) adduct of butanol (HLB=0.1), NEWPOL LB-1715, manufactured by Sanyo Chemical Industries, Ltd.

Base oil (e10): Polyoxypropylene (33 mol) adduct of butanol (HLB=0.2), NEWPOL LB-625, manufactured by Sanyo Chemical Industries, Ltd.

Base oil (e11): Polypropylene glycol (34 mol) (HLB=0.3), NEWPOL PP-2000, manufactured by Sanyo Chemical Industries, Ltd.

Base oil (e12): Oleate of polyoxypropylene (40 mol) glycol monobutyl ether (HLB=0)

Base oil (e13): Distearate of base oil (e4) (HLB=1.8)

Base oil (e14): Monooleate of propylene oxide (30 mol) adduct of castor oil (HLB=0.1)

Base oil (e15): Ethylene oxide (3 mol)/2-ethylhexyl glycidyl ether (6 mol) block adduct of glycerol (HLB=3.4)

Base oil (e16): Polyoxyethylene (3 mol) polyoxypropylene (14 mol) myristyl ether (HLB=2.3)

Base oil (e17): Polyether compound (HLB=0) obtained by reacting 200 parts of polyoxypropylene (34 mol) glycol, 231 parts of polyoxypropylene (14 mol) myristyl ether, and 16.8 parts of hexamethylene diisocyanate Base oil (e18): Polyol (HLB=2.5) having a hydroxyl value of 32 obtained by block adding alkylene oxides to pentaerythritol in the order of propylene oxide-ethylene oxide (the ratio of ethylene oxide: 12% by weight)

Base oil (e19): Glycerol propylene oxide adduct having a hydroxyl value of 56 (HLB=0.1) prepared in accordance with JP-A-2000-344881 {corresponding US patent: U.S. Pat. No. 6,531,566 B1 (the disclosure thereof is herein incorporated by reference)}

Base oil (e20): Edible rapeseed oil, manufactured by Nikko Seiyu Co. Ltd.

Base oil (e21): Methyl oleate, EXCEPARL M-OL, manufactured by Kao Corporation; "EXCEPARL" is a registered trademark of this company.

Base oil (e22): Dimethyl silicone oil (kinematic viscosity 50 (mm$^2$/s, 25° C.)), KF-96L-5CS, manufactured by Shin-Etsu Chemical Co., Ltd.

Base oil (e23): Dimethyl silicone oil, (kinematic viscosity 3000 (mm$^2$/s, 25° C.))) KF-96-3,000CS, manufactured by Shin-Etsu Chemical Co., Ltd.

Base oil (e24): Silicone compound in which, of the methyl groups of dimethylsilicone (number average molecular weight: 1800), four methyl groups per a molecule in average were substituted with a polyoxypropylene (25 mol) oxypropyl group Base oil (e25): Silicone compound, PULPSIL245C, manufactured by Wacker Asahikasei Silicone Co., Ltd.

Surfactant (fn1): Polyoxyethylene dioleate (HLB=10.4), IONET DO-600, manufactured by Sanyo Chemical Industries, Ltd.

Surfactant (fn2): Polyoxyethylene alkylene ether (HLB=10.7), NAROACTY CL-70, manufactured by Sanyo Chemical Industries, Ltd.

Surfactant (fn3): Sorbitan monooleate (HLB=4.3), IONET S-80, manufactured by Sanyo Chemical Industries, Ltd.

Surfactant (fn4): Polyoxyethylene alkylene ether (HLB=8.9), NAROACTY CL-40, manufactured by Sanyo Chemical Industries, Ltd.

Surfactant (fn5): Polyoxyethylene monooleate (HLB=11.8), IONET MO-400, manufactured by Sanyo Chemical Industries, Ltd.

Surfactant (fn6): Glycerol monooleate (HLB=3.5), EXCEL 0-95N, manufactured by Kao Corporation Surfactant (fa2): Sodium petroleum sulfonate solution (62% by weight of sodium petroleum sulfonate, 34% by weight of oil, and 4% by weight of water and inorganic salts), SULFOL 430A, manufactured by MORESCO Corporation Surfactant (fa3): Barium petroleum sulfonate solution (30% by weight of barium petroleum sulfonate, 69% by weight of oil, and 1% by weight of water and unknown substances), SULFOL BA-30N, manufactured by MORESCO Corporation Surfactant (fa4): Calcium petroleum sulfonate solution (45% by weight of calcium petroleum sulfonate, 54% by weight of oil, and 1% by weight of water and unknown substances), CA-45N, manufactured by MORESCO Corporation Water-soluble surfactant (fs1): Aqueous solution of sodium alkyl (having 10 to 16 carbon atoms) benzenesulfonate (50% by weight of sodium alkylbenzenesulfonate, and 50% by weight of water and mineral salt), NEWREX R, manufactured by NOF Corporation Water-soluble surfactant (fs2): Aqueous solution of sodium lauryl sulfate (31% by weight of sodium lauryl sulfate, and 69% by weight of water and mineral salt), SANDET LNM, manufactured by Sanyo Chemical Industries, Ltd.

Metallic soap (g1): Aluminum stearate, SA-1500, manufactured by Sakai Chemical Industry Co., Ltd.

Oil-soluble polymer (h1): Alkyl (meth)acrylate copolymer, ACLUBE 728, manufactured by Sanyo Chemical Industries, Ltd.

Oil-soluble polymer (h2): Petroleum resin, ARKON M-135, manufactured by Arakawa Chemical Industries, Ltd.

Oil-soluble polymer (h3): Liquid rubber, KURAPRENE LIR30, manufactured by Kuraray Co., Ltd.

Oil-soluble polymer (h4): Block copolymer containing hydrogenated polydiene block and polystyrene block, SEPTON 4033, manufactured by Kuraray Co., Ltd.

Preparation Examples (8) to (11) of Oil Phase

Oil phases (8) to (11) were obtained by adding, to the oil phase (1), other components shown in Table 3 {a nucleating agent, a base oil, and an oil-soluble polymer} {the amounts used are the numerals (parts) shown in Table 3}, and continuing stirring for 60 minutes to make uniform.

TABLE 3

|  | Oil phase (8) | Oil phase (9) | Oil phase (10) | Oil phase (11) |
| --- | --- | --- | --- | --- |
| Oil phase (1) | 860 | 990 | 990 | 678 |
| Nucleating agent (df1) | 73 |  |  |  |

TABLE 3-continued

|  | Oil phase (8) | Oil phase (9) | Oil phase (10) | Oil phase (11) |
| --- | --- | --- | --- | --- |
| Base oil (e18) | 63 |  |  |  |
| Base oil (e19) | 4 |  |  |  |
| Base oil (e22) |  | 10 |  |  |
| Base oil (e23) |  |  | 10 |  |
| Oil-soluble polymer (h1) |  |  |  | 322 |

Preparation Examples 12 to 16 of Oil Phase

Oil phases (12) to (16) were obtained in the same way as in Preparation Example (1) of Oil Phase except that the components of the solution (1) were changed to the components {a nucleating agent, a base oil, and a surfactant} given in Table 4 and the components of the receiving liquid (1) were changed to the components {a nucleating agent and a base oil} given in Table 5 {the amounts used are the numerals (parts) shown in Table 4 or 5}. An oil phase (X) is one prepared using a solution (X) and a receiving liquid (X) {"X" is a number of from 12 to 16}.

TABLE 4

|  | Solution (12) | Solution (13) | Solution (14) | Solution (15) | Solution (16) |
| --- | --- | --- | --- | --- | --- |
| Nucleating agent (da2) |  |  |  |  |  |
| Nucleating agent (da3) |  |  |  | 30 |  |
| Nucleating agent (db1) |  |  |  |  | 1 |
| Nucleating agent (db3) |  |  | 10 |  |  |
| Nucleating agent (dd2) | 50 |  |  |  |  |
| Nucleating agent (dd3) |  | 20 |  |  |  |
| Nucleating agent (de1) |  | 20 |  |  |  |
| Base oil (e1) |  |  |  | 300 | 300 |
| Base oil (e3) |  | 300 |  |  |  |
| Base oil (e9) |  |  |  |  | 300 |
| Base oil (e16) | 300 |  |  |  |  |
| Surfactant (fn3) | 0.4 |  |  |  | 5 |
| Surfactant (fn4) |  |  |  |  | 10 |
| Surfactant (fn5) |  |  |  |  | 3 |
| Surfactant (fn6) |  |  |  |  | 15 |
| Surfactant (fa3) |  |  | 15 |  |  |
| Surfactant (fa4) |  |  | 10 |  |  |

TABLE 5

|  | Receiving liquid (12) | Receiving liquid (13) | Receiving liquid (14) | Receiving liquid (15) | Receiving liquid (16) |
| --- | --- | --- | --- | --- | --- |
| Nucleating agent (da2) |  | 10 |  | 50 |  |
| Base oil (e1) |  |  | 200 | 160 |  |
| Base oil (e2) |  | 400 |  |  |  |
| Base oil (e4) |  |  | 150 |  |  |
| Base oil (e6) |  |  | 285 | 100 |  |
| Base oil (e9) |  | 70 |  |  | 666 |
| Base oil (e12) |  |  |  | 60 |  |
| Base oil (e16) | 450 |  |  |  |  |
| Base oil (e17) |  | 100 |  |  |  |
| Base oil (e21) | 190 |  | 40 |  |  |
| Base oil (e22) | 10 | 30 |  |  | 50 |

TABLE 5-continued

| | Receiving liquid (12) | Receiving liquid (13) | Receiving liquid (14) | Receiving liquid (15) | Receiving liquid (16) |
|---|---|---|---|---|---|
| Base oil (e23) | | | | 250 | |
| Base oil (e24) | | 50 | | | |

Preparation Example (17) of Oil Phase

In a container capable of heating, stirring, and cooling, 890 parts of the base oil (e1), 60 parts of the base oil (e16), 30 parts of the surfactant (fa1), and 50 parts of the metallic soap (g1) were heated to 145° C. under heating and stirring, then heating and stirring were continued for additional 15 minutes at that temperature to dissolve them uniformly, and then cooling and stirring were performed until the temperature reached 30° C., so that an oil phase (17) was obtained.

Preparation Examples (18) to (22) of Oil Phase

Oil phases (18) to (22) were obtained in the same way as in Preparation Example (17) of Oil Phase except that the raw materials to be used were changed to those {a nucleating agent, a base oil, a surfactant, a metallic soap, and an oil-soluble polymer} given in Table 6 {the amounts used are the numerals (parts) shown in Table 6}.

TABLE 6

| | Oil phase (18) | Oil phase (19) | Oil phase (20) | Oil phase (21) | Oil phase (22) |
|---|---|---|---|---|---|
| Nucleating agent (da1) | 30 | | | 50 | |
| Nucleating agent (da2) | | 30 | | | |
| Nucleating agent (da3) | | | 120 | 20 | 50 |
| Base oil (e1) | 520 | 730 | | 900 | 760 |
| Base oil (e12) | | | 680 | | |
| Base oil (e16) | 60 | | | | |
| Base oil (e20) | | | 200 | | 40 |
| Base oil (e23) | | | | | 40 |
| Surfactant (fn1) | 20 | | | | |
| Surfactant (fn2) | 20 | | | | |
| Surfactant (fn3) | 20 | | | | |
| Surfactant (fa1) | 70 | | | | 30 |
| Metallic soap (g1) | 350 | | | | 100 |
| Oil-soluble polymer (h1) | | | | 30 | |
| Oil-soluble polymer (h2) | | 150 | | | |
| Oil-soluble polymer (h3) | | | 50 | | |
| Oil-soluble polymer (h4) | | | | 9 | |

<Preparation of Hydrophilic Fumed Silica Dispersion Liquid (1)>

A container was charged with 60 parts of hydrophilic fumed silica (c1) {AEROSIL 130 (BET specific surface area=130 (m²/g), manufactured by Nippon Aerosil Co., Ltd.} and 940 parts of water (i1) {service water}, which were then stirred with an Excel Auto Homogenizer {manufactured by NISSEI Corporation} equipped with a colles-type blade, at 4000 rpm for 30 minutes, so that a hydrophilic fumed silica dispersion liquid (1) was obtained. The median diameter (d50, by number) of the silica in the hydrophilic fumed silica dispersion liquid (1) was 83 nm.

<Preparation of Hydrophilic Fumed Silica Dispersion Liquid (2)>

A container was charged with 60 parts of hydrophilic fumed silica (c2) {AEROSIL 300 (BET specific surface area=300 (m²/g), manufactured by Nippon Aerosil Co., Ltd.} and 920 parts of the water (i1), which were then treated with an ultrasonic disperser UP400S {manufactured by Hielscher Ultrasonic GmbH} at a strength of 20 for 1 minute, so that a hydrophilic fumed silica dispersion liquid (2) was obtained. The median diameter (d50, by number) of the silica in the hydrophilic fumed silica dispersion liquid (2) was 71 nm.

<Preparation of Hydrophilic Fumed Silica Dispersion Liquid (3)>

A container was charged with 80 parts of hydrophilic fumed silica (c3) {CAB-O-SIL L-90 (BET specific surface area=90 (m²/g), manufactured by Cabot Corporation} and 920 parts of water (i2) {ion-exchanged water}, which were then treated with an ultrasonic disperser UP400S at a strength of 20 for 2 minutes, so that a hydrophilic fumed silica dispersion liquid (3) was obtained. The median diameter (d50, by number) of the silica in the hydrophilic fumed silica dispersion liquid (3) was 91 nm.

<Preparation of Hydrophilic Fumed Silica Dispersion Liquid (4)>

A container was charged with 50 parts of hydrophilic fumed silica (c4) {AEROSIL 380 (BET specific surface area=380 (m²/g), manufactured by Nippon Aerosil Co., Ltd.} and 950 parts of the water (i1), which were then treated with an ultrasonic disperser UP400S at a strength of 50 for 10 minutes under cooling so that the temperature did not reach 50° C. or higher, so that a hydrophilic fumed silica dispersion liquid (4) was obtained. The median diameter (d50, by number) of the silica in the hydrophilic fumed silica dispersion liquid (4) was 34 nm.

<Preparation of Hydrophilic Fumed Silica Dispersion Liquid (5)>

A container was charged with 50 parts of hydrophilic fumed silica (c5) {REOLOSIL QS-10 (BET specific surface area=140 (m²/g), manufactured by Tokuyama Corporation} and 950 parts of the water (i1), which were then treated with an ultrasonic disperser UP400S at a strength of 20 for 2 minutes, so that a hydrophilic fumed silica dispersion liquid (5) was obtained. The median diameter (d50, by number) of the silica in the hydrophilic fumed silica dispersion liquid (5) was 79 nm.

<Preparation of Hydrophilic Fumed Silica Dispersion Liquid (6)>

A container was charged with 60 parts of hydrophilic fumed silica (c6) {AEROSIL 50 (BET specific surface area=50 (m²/g), manufactured by Nippon Aerosil Co., Ltd.} and 940 parts of the water (i1), which were then treated with an ultrasonic disperser UP400S at a strength of 20 for 2 minutes, so that a hydrophilic fumed silica dispersion liquid (6) was obtained. The median diameter (d50, by number) of the silica in the hydrophilic fumed silica dispersion liquid (6) was 98 nm.

<Preparation of Aqueous Thickener Solution (1)>

Anaqueous thickener solution (1) was obtained by adding 20 parts of a thickener (1) {xanthan gum, KELZAN, manufactured by Sansho Co., Ltd.}, 0.1 parts of an antiseptic (1) {BIOKILLER LS, manufactured by KI Chemical Industry Co., Ltd.} and 980 parts of the water (i1) to a container capable of stirring, and then stirring the mixture until uniform.

<Preparation of Aqueous Thickener Solution (2)>

Anaqueous thickener solution (2) was obtained by adding 15 parts of a thickener (2) {hydroxypropylmethylcellulose, METOLOSE 65SH-15000, Shin-Etsu Chemical Co., Ltd.}, 0.1 parts of the antiseptic (1), and 985 parts of the water (i1) to a container capable of stirring, and then stirring the mixture until uniform.

Example 1

A mixed liquid was obtained by putting 300 parts of the oil phase (1) in a container, dropping 180 parts of the aqueous thickener solution (1) under stirring with a glass stirring rod, and stirring the mixture for 5 minutes to make uniform.

While stirring the mixed liquid, 360 parts of the hydrophilic fumed silica dispersion liquid (1) was dropped thereto, 160 parts of the water (i1) was further added, and then the mixture was stirred uniformly, so that an oil-in-water defoaming agent (1) of the present invention was obtained.

The median diameter (d50, by number) (μm) of the emulsion particles of the defoaming agent (1) was 4.8.

Transmitted light observation at 100 magnifications with an optical microscope {manufactured by Olympus Corporation, BX-60, eyepiece: WH10X/22, objective lens: UPlanFI 10X/0.30 phi, condenser: UPCD-ph1} confirmed that the defoaming agent prepared was in the form of an oil-in-water emulsion (the same applies hereinafter).

Example 2

A mixed liquid was obtained by putting 300 parts of the oil phase (2) in a container, adding 5 parts of the surfactant (fn1), 5 parts of the surfactant (fn2) and 5 parts of the surfactant (fn3) under stirring with a glass stirring rod, followed by stirring for 5 minutes to make uniform, then dropping 180 parts of the aqueous thickener solution (1), and stirring the mixture for 5 minutes to make uniform.

While stirring the mixed liquid, 360 parts of the hydrophilic fumed silica dispersion liquid (1) was dropped thereto, 160 parts of the water (i1) was further added, and then the mixture was stirred uniformly, so that an oil-in-water defoaming agent (2) of the present invention was obtained. The median diameter (d50, by number) (μm) of the emulsion particles of defoaming agent (2) was 2.1.

Example 3

A defoaming agent (3) of the present invention was obtained in the same way as in Example 2 except that the oil phase (2) was changed to an oil phase (3). The median diameter (d50, by number) (μm) of the emulsion particles of the defoaming agent (3) was 1.0.

Examples 4 to 14

Defoaming agents (4) to (14) of the present invention were obtained in the same way as in Example 1 except that the oil phase (1) was changed to any of oil phases (4) to (14) {the number indicating a defoaming agent corresponds to the number indicating an oil phase}. The median diameters (d50, by number) (μm) of the emulsion particles of the defoaming agents (4) to (14) were as shown in Table 10.

Example 15

A mixed liquid was obtained by putting 300 parts of an oil phase (15) in a container, adding 5 parts of an surfactant (fn7) {polyoxyethylene polyoxypropylene glycol (HLB=8.0), NEWPOL PE-74, manufactured by Sanyo Chemical Industries, Ltd.}, 5 parts of the surfactant (fn2) and 5 parts of the surfactant (fn3) under stirring with a glass stirring rod, followed by stirring for 5 minutes to make uniform, then dropping thereto 180 parts of the aqueous thickener solution (1), and stirring the mixture for 5 minutes to make uniform.

While stirring the mixed liquid, 360 parts of the hydrophilic fumed silica dispersion liquid (1) was dropped thereto, 160 parts of a 3% aqueous solution of the water-soluble surfactant (fs2) {polyoxyethylene sorbitan monooleate (HLB=15.7), NONION OT-221, manufactured by NOF Corporation} was further added, and then the mixture was stirred uniformly, so that an oil-in-water defoaming agent (15) of the present invention was obtained. The median diameter (d50, by number) (μm) of the emulsion particles of the defoaming agent (15) was 2.3.

Examples 16 and 17

Defoaming agents (16) and (17) of the present invention were obtained in the same way as in Example 1 except that the oil phase (1) was changed to an oil phase (16) or an oil phase (17) {the number indicating a defoaming agent corresponds to the number indicating an oil phase}. The median diameters (d50, by number) (μm) of the emulsion particles of the defoaming agents (16) and (17) were 1.3 and 5.2, respectively.

Example 18

In a container capable of heating, stirring, and cooling, 300 parts of the oil phase (18) was heated to 90° C. and stirred, then 180 parts of the aqueous thickener solution (1) was dropped under heating and stirring so that the temperature of the oil phase was kept at 75° C. to 90° C., and then the mixture was stirred for 5 minutes to be made uniform, so that a mixed liquid was obtained.

While continuing stirring the mixed liquid with it kept at 75° C. to 90° C., 360 parts of the hydrophilic fumed silica dispersion liquid (1) was dropped thereto, 160 parts of the water (i1) was further added, and then the mixture was cooled to 25° C. under stirring, so that an oil-in-water defoaming agent (18) of the present invention was obtained. The median diameter (d50, by number) (μm) of the emulsion particles of the defoaming agent (18) was 22.0.

Example 19

In a container capable of heating, stirring, and cooling, 300 parts of the oil phase (19) was heated to 90° C. and stirred, then 5 parts of the surfactant (fn8) {polyoxyethylene castor oil (HLB=6.4), BLAUNON BR-410, manufactured by Aoki Oil Industrial Co., Ltd.}, 5 parts of the surfactant (fn2), and 5 parts of the surfactant (fn3) were added and made uniform, then 180 parts of the aqueous thickener solution (1) was dropped under heating and stirring so that the temperature during the dropping was kept at 75° C. to 90° C., and then the mixture was stirred for 5 minutes to be made uniform, so that a mixed liquid was obtained.

While continuing stirring the mixed liquid with it kept at 75° C. to 90° C., 360 parts of the hydrophilic fumed silica dispersion liquid (1) was dropped thereto, 160 parts of the water (i1) was further added, and then the mixture was cooled to 25° C. under stirring, so that an oil-in-water defoaming agent (19) of the present invention was obtained.

The median diameter (d50, by number) (µm) of the emulsion particles of the defoaming agent (19) was 18.7.

Examples 20 to 22

Defoaming agents (20) to (22) of the present invention were obtained in the same way as in Example 19 except that the oil phase (19) was changed to any of oil phases (20) to (22) {the number indicating a defoaming agent corresponds to the number indicating an oil phase}. The median diameters (d50, by number) (µm) of the emulsion particles of the defoaming agents (20) to (22) were as shown in Table 10.

Examples 23 to 27

Defoaming agents (23) to (27) of the present invention were obtained in the same way as in Example 1 except that 180 parts of the aqueous thickener solution (1) was changed to the contents given in Table 7 {an aqueous thickener solution or a mixture thereof with water; the amounts used are the numbers given in Table 7}. The median diameters (d50, by number) (µm) of the emulsion particles of the defoaming agents (23) to (27) were as shown in Table 10.

TABLE 7

|  | Example 23 | Example 24 | Example 25 | Example 26 | Example 27 |
|---|---|---|---|---|---|
| Aqueous thickener solution (1) | 90 | 45 |  |  |  |
| Aqueous thickener solution (2) |  |  |  | 180 | 90 |
| Water (j1) | 90 | 135 | 180 |  |  |
| Water (j2) |  |  |  |  | 90 |

Examples 28 to 32

Defoaming agents (28) to (32) of the present invention were obtained in the same way as in Example 1 except that the hydrophilic fumed silica dispersion liquid (1) was changed to any one of the hydrophilic fumed silica dispersion liquids (2) to (6) {the number indicating a defoaming agent corresponds to the number produced by adding 26 to the number indicating a hydrophilic fumed silica dispersion liquid}. The median diameters (d50, by number) (µm) of the emulsion particles of the defoaming agents (28) to (32) were as shown in Table 10.

Examples 33 to 40

Defoaming agents (33) to (40) of the present invention were obtained in the same way as in Example 1 except that the amounts of the oil phase (1), the aqueous thickener solution (1), the hydrophilic fumed silica (1), and the water (i1) were changed to the amounts (parts) shown in Table 8. The median diameters (d50, by number) (µm) of the emulsion particles of the defoaming agents (33) to (40) were as shown in Table 10.

TABLE 8

|  | Example 33 | Example 34 | Example 35 | Example 36 |
|---|---|---|---|---|
| Oil phase (1) | 100 | 600 | 100 | 360 |
| Aqueous thickener solution (1) | 67 | 240 | 75 | 240 |
| Hydrophilic fumed silica dispersion liquid (1) | 833 | 160 | 17 | 75 |
| Water (i1) |  |  | 808 | 325 |

|  | Example 37 | Example 38 | Example 39 | Example 40 |
|---|---|---|---|---|
| Oil phase (1) | 140 | 500 | 200 | 150 |
| Aqueous thickener solution (1) | 110 | 200 | 100 | 100 |
| Hydrophilic fumed silica dispersion liquid (1) | 750 | 300 | 167 | 417 |
| Water (i1) |  |  | 533 | 333 |

Example 41

A defoaming agent (41) of the present invention was obtained in the same way as in Example 1 except that the oil phase (1) was changed to the oil phase (14) and that the stirring with a glass stirring rod was changed to stirring at 1,000 rpm with an Excel Auto Homogenizer equipped with a colles-type blade. The median diameter (d50, by number) (µm) of the emulsion particles of the defoaming agent (41) was 0.5.

Example 42

A defoaming agent (42) of the present invention was obtained in the same way as in Example 1 except that the oil phase (1) was changed to the oil phase (14) and that the stirring with a glass stirring rod was changed to stirring at 4,000 rpm with an Excel Auto Homogenizer equipped with a colles-type blade. The median diameter (d50, by number) (µm) of the emulsion particles of the defoaming agent (42) was 0.3.

Examples 43 to 47

Defoaming agents (43) to (47) of the present invention were obtained in the same way as in Example 1 except that the surfactants shown in Table 9 were mixed with 300 parts of the oil phase (1) {the amounts used are the numbers (parts) shown in Table 9} and the resulting mixtures were each used as an oil phase. The median diameters (d50, by number) (µm) of the emulsion particles of the defoaming agents (43) to (47) were as shown in Table 10.

TABLE 9

|  | Example 43 | Example 44 | Example 45 | Example 46 | Example 47 |
|---|---|---|---|---|---|
| Surfactant (fn1) | 14 | 7 | 3 |  |  |
| Surfactant (fn2) | 20 | 10 | 5 | 10 |  |
| Surfactant (fn3) | 14 | 7 | 3 |  |  |
| Surfactant (fn5) |  |  |  |  | 10 |

Example 48

A container was charged with 150 parts of the water (i1), 300 parts of the hydrophilic fumed silica dispersion liquid (4), and 150 parts of the aqueous thickener solution (1), and then the oil phase (2) was dropped under stirring with a glass stirring rod, so that an oil-in-water type defoaming agent (48) of the present invention was obtained. The median diameter (d50, by number) (μm) of the emulsion particles of the defoaming agent (48) was 10.3.

Examples 49 to 51

Defoaming agents (49) to (51) of the present invention were obtained in the same way as in Example 48 except that the oil phase (2) was changed to the oil phase (6), (12) or (16) {the defoaming agent (49) was produced using the oil phase (6), the defoaming agent (50) was produced using the oil phase (12), and the defoaming agent (51) was produced using the oil phase (16)}. The median diameters (d50, by number) (μm) of the emulsion particles of the defoaming agents (49) to (51) were as shown in Table 10.

Example 52

A container was charged with 300 parts of the oil phase (1), 3 parts of the surfactant (fn1), 4 parts of the surfactant (fn2), and 3 parts of the surfactant (fn3), which were then stirred with an Excel Auto Homogenizer equipped with a colles-type blade at 3,000 rpm and simultaneously 40 parts of the hydrophilic fumed silica (c1) was added gradually, followed by stirring for 5 minutes to make uniform, so that a hydrophilic silica-dispersed oil phase (ac1) was obtained.

Another container was charged with 340 parts of the water (i1) and 340 parts of the aqueous thickener solution (1), and the hydrophilic silica-dispersed oil phase (ac1) was dropped under stirring the mixture with a glass stirring rod, so that an oil-in-water type defoaming agent (52) of the present invention was obtained. The median diameter (d50, by number) (μm) of the emulsion particles of the defoaming agent (52) was 4.7.

Example 53

A container was charged with 340 parts of the water (i1) and 340 parts of the aqueous thickener solution (1), which were then stirred with an Excel Auto Homogenizer equipped with a colles-type blade at 3,000 rpm and simultaneously the hydrophilic silica-dispersed oil phase (ac1) was dropped, so that an oil-in-water type defoaming agent (53) of the present invention was obtained. The median diameter (d50, by number) (μm) of the emulsion particles of the defoaming agent (53) was 3.1.

Example 54

A container was charged with 300 parts of the hydrophilic silica-dispersed oil phase (ac1), which was stirred with a glass stirring rod and simultaneously 340 parts of the aqueous thickener solution (1) was added and mixed uniformly, and then 340 parts by weight of the water (i1) was added, followed by stirring for 5 minutes, so that an oil-in-water type defoaming agent (54) of the present invention was obtained. The median diameter (d50, by number) (μm) of the emulsion particles of the defoaming agent (54) was 3.8.

Example 55

A container was charged with 250 parts of the base oil (e25), which was stirred with a glass stirring rod and simultaneously 185 parts of the water (i1), 50 parts of the aqueous thickener solution (1), and 15 parts of the hydrophilic fumed silica (c2) were added and mixed uniformly, and then 450 parts of the water (i1) and 50 parts of the aqueous thickener solution (1) were added, followed by stirring for 5 minutes, so that an oil-in-water type defoaming agent (55) of the present invention was obtained. The median diameter (d50, by number) (μm) of the emulsion particles of the defoaming agent (55) was 5.7.

TABLE 10

|  | Median diameter (d50, by number) (μm) |
|---|---|
| Defoaming agent (1) | 4.8 |
| Defoaming agent (2) | 2.1 |
| Defoaming agent (3) | 1.0 |
| Defoaming agent (4) | 7.1 |
| Defoaming agent (5) | 12.7 |
| Defoaming agent (6) | 6.3 |
| Defoaming agent (7) | 19.8 |
| Defoaming agent (8) | 2.1 |
| Defoaming agent (9) | 4.8 |
| Defoaming agent (10) | 5.0 |
| Defoaming agent (11) | 24.0 |
| Defoaming agent (12) | 0.8 |
| Defoaming agent (13) | 2.8 |
| Defoaming agent (14) | 0.9 |
| Defoaming agent (15) | 2.3 |
| Defoaming agent (16) | 1.3 |
| Defoaming agent (17) | 5.2 |
| Defoaming agent (18) | 22.0 |
| Defoaming agent (19) | 18.7 |
| Defoaming agent (20) | 17.3 |
| Defoaming agent (21) | 9.1 |
| Defoaming agent (22) | 11.3 |
| Defoaming agent (23) | 5.7 |
| Defoaming agent (24) | 6.6 |
| Defoaming agent (25) | 18.2 |
| Defoaming agent (26) | 6.4 |
| Defoaming agent (27) | 10.1 |
| Defoaming agent (28) | 4.6 |
| Defoaming agent (29) | 4.9 |
| Defoaming agent (30) | 4.1 |
| Defoaming agent (31) | 4.6 |
| Defoaming agent (32) | 4.8 |
| Defoaming agent (33) | 1.9 |
| Defoaming agent (34) | 8.2 |
| Defoaming agent (35) | 6.4 |
| Defoaming agent (36) | 5.4 |
| Defoaming agent (37) | 1.8 |
| Defoaming agent (38) | 5.1 |
| Defoaming agent (39) | 4.7 |
| Defoaming agent (40) | 2.8 |
| Defoaming agent (41) | 0.5 |
| Defoaming agent (42) | 0.3 |
| Defoaming agent (43) | 16.9 |
| Defoaming agent (44) | 11.4 |
| Defoaming agent (45) | 3.4 |
| Defoaming agent (46) | 9.1 |
| Defoaming agent (47) | 6.5 |
| Defoaming agent (48) | 10.3 |
| Defoaming agent (49) | 19.3 |
| Defoaming agent (50) | 1.5 |
| Defoaming agent (51) | 2.7 |
| Defoaming agent (52) | 4.7 |
| Defoaming agent (53) | 3.1 |
| Defoaming agent (54) | 3.8 |
| Defoaming agent (55) | 5.7 |

Comparative Examples 1 to 19

Comparative defoaming agents (H1) to (H19) were obtained in the same way as in Examples 1 to 19 except that the hydrophilic fumed silica dispersion liquid (1) was changed to the water (i1) {the number indicating a comparative defoaming agent corresponds to the number of Example}. The median diameters (d50, by number) (μm) of the emulsion particles of the comparative defoaming agents (H1) to (H19) were as shown in Table 11.

Comparative Example 20

A container was charged with 300 parts of the oil phase (1), which was then stirred with an Excel Auto Homogenizer equipped with a colles-type blade at 3,000 rpm and simultaneously 4.8 parts of the surfactant (fn1), 6.4 parts of the surfactant (fn2) and 4.8 parts of the surfactant (fn3) were added, followed by stirring for 1 minute to make uniform, and then 180 parts of the aqueous thickener solution (1) was dropped under stirring, followed by stirring for 1 minute to make uniform, so that a mixed liquid was obtained.

While stirring the mixed liquid, 520 parts of a 1.5% aqueous solution of the water-soluble surfactant (fs3) was dropped thereinto and stirred uniformly, so that a comparative defoaming agent (H20) was obtained. The median diameter (d50, by number) (μm) of the emulsion particles of the defoaming agent (H20) was 0.2.

TABLE 11

| | Median diameter (d50, by number) (μm) |
|---|---|
| Defoaming agent (H1) | Poor Emulsification |
| Defoaming agent (H2) | 13.2 |
| Defoaming agent (H3) | 2.8 |
| Defoaming agent (H4) | Poor Emulsification |
| Defoaming agent (H5) | Poor Emulsification |
| Defoaming agent (H6) | 1.1 |
| Defoaming agent (H7) | Poor Emulsification |
| Defoaming agent (H8) | Poor Emulsification |
| Defoaming agent (H9) | Poor Emulsification |
| Defoaming agent (H10) | Poor Emulsification |
| Defoaming agent (H11) | Poor Emulsification |
| Defoaming agent (H12) | 1.3 |
| Defoaming agent (H13) | 0.9 |
| Defoaming agent (H14) | Poor Emulsification |
| Defoaming agent (H15) | Poor Emulsification |
| Defoaming agent (H16) | Poor Emulsification |
| Defoaming agent (H17) | Poor Emulsification |
| Defoaming agent (H18) | Poor Emulsification |
| Defoaming agent (H19) | Poor Emulsification |
| Defoaming agent (H20) | 0.2 |

When an oil phase was not properly emulsified and an oil-in-water emulsion was not obtained, this is indicated as "poor emulsification."

<Preparation of Hydrophilic Precipitated Silica Dispersion Liquid (1)>

A container was charged with 50 parts of the hydrophilic precipitated silica (1) {Nipsil NA, manufactured by Tosoh Silica Corporation} and 950 parts of the water (i1), which were then treated with an ultrasonic disperser UP400S at a strength of 20 for 2 minutes, so that a hydrophilic precipitated silica dispersion liquid (1) was obtained. The median diameter (d50, by number) of the silica in the hydrophilic precipitated silica dispersion liquid (1) was 13.5 μm.

<Preparation of Hydrophilic Gel-Processed Silica Dispersion Liquid (1)>

A container was charged with 50 parts of the hydrophilic gel-processed silica (1) {NIPGEL AZ-600, manufactured by Tosoh Silica Corporation} and 950 parts of the water (i1), which were then treated with an ultrasonic disperser UP400S at a strength of 20 for 2 minutes, so that a hydrophilic gel-processed silica dispersion liquid (1) was obtained. The median diameter (d50, by number) of the silica in the hydrophilic gel-processed silica dispersion liquid (1) was 4.2 μm.

Comparative Example 21

Preparation of an oil-in-water emulsion was attempted in the same way as in Example 1 except that the hydrophilic fumed silica dispersion liquid (1) was changed to the hydrophilic precipitated silica dispersion liquid (1), but the oil phase was not properly emulsified and an oil-in-water emulsion was not obtained.

Comparative Example 22

Preparation of an oil-in-water emulsion was attempted in the same way as in Example 1 except that the hydrophilic fumed silica dispersion liquid (1) was changed to the hydrophilic gel-processed silica dispersion liquid (1), but the oil phase was not properly emulsified and an oil-in-water emulsion was not obtained.

<Evaluation of Defoaming Property (1)>

Using the defoaming agents (1) to (55), (H2), (H3), (H6), (H12), (H13), and (H20) obtained in Examples 1 to 55 and Comparative Examples 1 to 22, defoaming property for the emulsion paints prepared in the manner described below was evaluated, and the evaluation results were shown in Tables 13 and 14.

Moreover, using the oil phases (1) to (3), (18), and (19), emulsion paints were prepared in the same manner, and their defoaming property was evaluated. The evaluation results were shown in Table 14.

(1) Preparation of Emulsion Base Paint

Grinding and letting down were performed with the following raw material compositions by using an EXCEL-AUTO HOMOGENIZER (Nihonseiki Co., Ltd., Model ED) equipped with an impeller-type blade to form a paint. The resulting paint was diluted with the water (i1) to 80 KU (25° C.) using a Stormer viscometer (JIS K5600-2-2), so that an emulsion-based paint was obtained.

TABLE 12

| Grinding step | Water | 14.4 parts | |
|---|---|---|---|
| | SN-Dispersant 5040 | 0.5 parts | Note 1 |
| | SN-Thickener 640 | 0.5 parts | Note 2 |
| | Aqueous ammonia solution (25%) | 0.1 parts | |
| | SUN LIGHT SL-300 | 22.2 parts | Note 3 |
| | TIPAQUE T930 | 18.5 parts | Note 4 |
| Letdown step | ACRONAL 295DN | 30.4 parts | Note 5 |
| | Nopcocide SN135 | 1.0 part | Note 6 |
| | TEXANOL | 3.7 parts | Note 7 |
| | SN-Thickener 621N | 0.2 parts | Note 8 |
| | Water | 9.5 parts | |
| | Total | 100.0 parts | |

Note 1: Dispersant manufactured by San Nopco Ltd.
Note 2: Thickener manufactured by San Nopco Ltd.
Note 3: Calcium carbonate manufactured by Takehara Kagaku Kogyo Co., Ltd.
Note 4: Titanium dioxide manufactured by Ishihara Sangyo Kaisha, Ltd.
Note 5: Acrylic emulsion manufactured by BASF A.G.; "ACRONAL" is a registered trademark of BASF Aktiengesellschaft.
Note 6: Antiseptic manufactured by San Nopco Ltd.
Note 7: Film conditioner manufactured by Eastman Chemical Company; "TEXANOL" is a registered trademark of YOSHIMURA OIL CHEMICAL Co., Ltd.
Note 8: Thickener manufactured by San Nopco Ltd.

(2) Preparation of Emulsion Paint

To an emulsion base paint was added a sample to be evaluated (a defoaming agent) so that the amount of the oil phase (A) in the defoaming agent was 0.3% by weight based on the weight of the emulsion base paint, followed by stirring and mixing with an Excel Auto Homogenizer equipped with an impeller-type blade at 25° C. and 2,000 rpm for 5 minutes, and then 5% by weight (based on the emulsion paint) of the water (i1) was further added and mixed uniformly. Thus, emulsion paints (1) to (66) were obtained. In addition, an emulsion paint (67) was obtained for blank in the same way except that no defoaming agent was added.

(3) Evaluation of Initial Defoaming Property (Defoaming Property)

In a controlling room conditioned to 25° C. and a relative humidity of 60%, a tin plate {0.5 mm in thickness, cut into 10 cm×15 cm} was degreased with acetone/cloth and then emulsion paints (1) to (67) were applied with a roller so that the wet film thickness was 250 µm. Thereafter, the amount of foams at the time 1 minute after the application and the amount of foam marks after drying for 1 day (leaving at rest in the controlling room) were evaluated.

(4) Evaluation of Repelling

In a controlling room conditioned to 25° C. and a relative humidity of 60%, a tin plate {0.5 mm in thickness, cut into 10 cm×15 cm} was degreased with acetone/cloth, and then emulsion paints (1) to (67) were applied with a roller so that the wet film thickness was 250 and dried for 1 day (leaving at rest in the controlling room). Thereafter, the surface of a coating film was observed and the number of repelling was evaluated.

(5) Evaluation of Defoaming Durability

Each of the emulsion paints (1) to (67) was left at rest and stored in a sealed sample container at 40° C. for 1 month and then was cooled to 25° C., affording an emulsion paint for defoaming durability evaluation, and the defoaming durability (defoaming property) was evaluated in the same manner.

<Defoaming Properties (Initial Defoaming Property, Defoaming Durability; 1 Minute after Application)>

5: There are no foams.
4: There are up to 4 foams.
3: There are 5 to 10 foams.
2: There are 11 to 20 foams.
1: There are 21 or more foams.

<Defoaming Properties (Initial Defoaming Property, Defoaming Durability; after Drying)>

5: There are no foam marks.
4: There are up to 2 foam marks.
3: There are 3 to 5 foam marks.
2: There are 6 to 10 foam marks.
1: There are 11 or more foam marks.

TABLE 13

|  |  | Emulsion paint | Initial defoaming property | | Defoaming durability | | Repelling (number) | Oil phase used |
|---|---|---|---|---|---|---|---|---|
|  |  |  | Immediately after | After drying | Immediately after | After drying |  |  |
| Example | 1 | 1 | 4 | 5 | 3 | 4 | 0 | 1 |
|  | 2 | 2 | 3 | 5 | 3 | 5 | 0 | 2 |
|  | 3 | 3 | 4 | 5 | 4 | 4 | 2 | 3 |
|  | 4 | 4 | 4 | 5 | 4 | 5 | 0 | 4 |
|  | 5 | 5 | 5 | 5 | 4 | 5 | 0 | 5 |
|  | 6 | 6 | 4 | 5 | 4 | 4 | 0 | 6 |
|  | 7 | 7 | 5 | 5 | 5 | 5 | 1 | 7 |
|  | 8 | 8 | 4 | 5 | 4 | 4 | 0 | 8 |
|  | 9 | 9 | 4 | 5 | 3 | 5 | 3 | 9 |
|  | 10 | 10 | 4 | 5 | 3 | 5 | 1 | 10 |
|  | 11 | 11 | 5 | 5 | 5 | 5 | 8 | 11 |
|  | 12 | 12 | 3 | 4 | 3 | 4 | 0 | 12 |
|  | 13 | 13 | 4 | 4 | 4 | 4 | 4 | 13 |
|  | 14 | 14 | 4 | 4 | 4 | 4 | 0 | 14 |
|  | 15 | 15 | 5 | 5 | 4 | 5 | 16 | 15 |
|  | 16 | 16 | 4 | 5 | 4 | 5 | 4 | 16 |
|  | 17 | 17 | 3 | 5 | 3 | 5 | 0 | 17 |
|  | 18 | 18 | 4 | 4 | 4 | 4 | 0 | 18 |
|  | 19 | 19 | 4 | 4 | 4 | 4 | 0 | 19 |
|  | 20 | 20 | 4 | 5 | 4 | 5 | 0 | 20 |
|  | 21 | 21 | 5 | 5 | 5 | 5 | 0 | 21 |
|  | 22 | 22 | 4 | 5 | 3 | 5 | 0 | 22 |
|  | 23 | 23 | 4 | 5 | 3 | 4 | 0 | 23 |
|  | 24 | 24 | 4 | 5 | 3 | 4 | 0 | 24 |
|  | 25 | 25 | 4 | 5 | 3 | 4 | 0 | 25 |
|  | 26 | 26 | 4 | 5 | 3 | 4 | 0 | 26 |
|  | 27 | 27 | 4 | 5 | 3 | 4 | 0 | 27 |
|  | 28 | 28 | 4 | 5 | 3 | 4 | 0 | 1 |
|  | 29 | 29 | 4 | 5 | 3 | 4 | 0 | 1 |
|  | 30 | 30 | 4 | 5 | 3 | 4 | 0 | 1 |
|  | 31 | 31 | 4 | 5 | 3 | 4 | 0 | 1 |
|  | 32 | 32 | 4 | 5 | 3 | 4 | 0 | 1 |
|  | 33 | 33 | 4 | 5 | 3 | 4 | 0 | 1 |
|  | 34 | 34 | 4 | 5 | 3 | 4 | 0 | 1 |
|  | 35 | 35 | 4 | 5 | 3 | 4 | 0 | 1 |
|  | 36 | 36 | 4 | 5 | 3 | 4 | 0 | 1 |
|  | 37 | 37 | 4 | 5 | 3 | 4 | 0 | 1 |
|  | 38 | 38 | 4 | 5 | 3 | 4 | 0 | 1 |
|  | 39 | 39 | 4 | 5 | 3 | 4 | 0 | 1 |
|  | 40 | 40 | 4 | 5 | 3 | 4 | 0 | 1 |
|  | 41 | 41 | 3 | 4 | 3 | 4 | 0 | 14 |
|  | 42 | 42 | 3 | 4 | 3 | 4 | 0 | 14 |
|  | 43 | 43 | 4 | 5 | 3 | 4 | 0 | 1 |
|  | 44 | 44 | 4 | 5 | 3 | 4 | 0 | 1 |

TABLE 13-continued

|  | Emulsion paint | Initial defoaming property | | Defoaming durability | | Repelling (number) | Oil phase used |
|---|---|---|---|---|---|---|---|
|  |  | Immediately after | After drying | Immediately after | After drying |  |  |
| 45 | 45 | 4 | 4 | 4 | 4 | 0 | 1 |
| 46 | 46 | 4 | 5 | 4 | 4 | 0 | 1 |
| 47 | 47 | 4 | 5 | 3 | 4 | 0 | 1 |
| 48 | 48 | 3 | 5 | 3 | 5 | 0 | 2 |
| 49 | 49 | 4 | 4 | 4 | 4 | 0 | 6 |
| 50 | 50 | 3 | 3 | 3 | 3 | 0 | 12 |
| 51 | 51 | 4 | 5 | 4 | 5 | 6 | 16 |
| 52 | 52 | 4 | 5 | 3 | 4 | 0 | 1 |
| 53 | 53 | 4 | 5 | 3 | 4 | 0 | 1 |
| 54 | 54 | 4 | 5 | 3 | 4 | 0 | 1 |
| 55 | 55 | 3 | 4 | 3 | 4 | 42 | Base oil (e25) |

TABLE 14

|  |  | Emulsion paint | Initial defoaming property | | Defoaming durability | | Repelling (number) | Oil phase used |
|---|---|---|---|---|---|---|---|---|
|  |  |  | Immediately after | After drying | Immediately after | After drying |  |  |
| Comparative Example | 2 | 56 | 3 | 4 | 3 | 4 | 3 | 2 |
|  | 3 | 57 | 3 | 4 | 3 | 3 | 7 | 3 |
|  | 6 | 58 | 4 | 4 | 4 | 4 | 8 | 6 |
|  | 12 | 59 | 3 | 3 | 3 | 3 | 3 | 12 |
|  | 13 | 60 | 4 | 4 | 4 | 4 | 12 | 13 |
|  | 20 | 61 | 1 | 2 | 1 | 2 | 0 | 1 |
| Oil phase | 1 | 62 | 3 | 4 | 3 | 4 | 0 | — |
|  | 2 | 63 | 3 | 4 | 3 | 4 | 1 | — |
|  | 3 | 64 | 3 | 4 | 3 | 4 | 5 | — |
|  | 18 | 65 | 1 | 1 | 1 | 1 | 2 | — |
|  | 19 | 66 | 1 | 2 | 1 | 2 | 1 | — |
| Blank |  | 67 | 1 | 1 | 1 | 1 | 0 | — |

The emulsion paints using the defoaming agents of the present invention were improved in defoaming properties (initial defoaming property and defoaming durability) and reduced in repelling as compared with those using the comparative defoaming agents prepared using the same oil phase and those using the oil phase directly.

<Evaluation of Stability of Defoaming Agent>

Each of the defoaming agents (1) to (55), (H2), (H3), (H6), (H12), (H13), and (H20) obtained in Examples and Comparative Examples was put in a sealed glass container and left at rest in an atmosphere of 40° C. for 1 week, and then the appearance of the sample was checked and evaluated according to the following criteria. The evaluation results were shown in Tables 15 and 16.

◯: There is no change from the time before the lapse of several days.

Δ: The emulsion state is maintained though separation occurs, and the emulsion is brought back to a uniform state by capping the bottle and shaking it vertically 20 strokes by hand.

x: Since separation occurs and the emulsion state is destroyed, the emulsion does not return to its original state even if it is shaken vertically.

TABLE 15

|  |  | Stability |
|---|---|---|
| Example | 1 | ◯ |
|  | 2 | ◯ |
|  | 3 | ◯ |
|  | 4 | ◯ |
|  | 5 | Δ |
|  | 6 | ◯ |
|  | 7 | Δ |
|  | 8 | ◯ |
|  | 9 | ◯ |
|  | 10 | ◯ |
|  | 11 | Δ |
|  | 12 | ◯ |
|  | 13 | ◯ |
|  | 14 | ◯ |
|  | 15 | ◯ |
|  | 16 | ◯ |
|  | 17 | ◯ |
|  | 18 | Δ |
|  | 19 | Δ |
|  | 20 | ◯ |
|  | 21 | ◯ |
|  | 22 | ◯ |
|  | 23 | ◯ |
|  | 24 | ◯ |
|  | 25 | Δ |
|  | 26 | Δ |
|  | 27 | ◯ |
|  | 28 | ◯ |
|  | 29 | ◯ |
|  | 30 | ◯ |
|  | 31 | ◯ |
|  | 32 | ◯ |

TABLE 15-continued

| | | Stability |
|---|---|---|
| | 33 | ○ |
| | 34 | ○ |
| | 35 | ○ |
| | 36 | ○ |
| | 37 | ○ |
| | 38 | ○ |
| | 39 | ○ |
| | 40 | ○ |
| | 41 | ○ |
| | 42 | ○ |
| | 43 | Δ |
| | 44 | ○ |
| | 45 | ○ |
| | 46 | ○ |
| | 47 | ○ |
| | 48 | ○ |
| | 49 | Δ |
| | 50 | ○ |
| | 51 | ○ |
| | 52 | ○ |
| | 53 | ○ |
| | 54 | ○ |
| | 55 | ○ |

TABLE 16

| | | Stability |
|---|---|---|
| Comparative Example | 2 | X |
| | 3 | X |
| | 6 | X |
| | 12 | X |
| | 13 | X |
| | 20 | ○ |

The defoaming agents of the present invention exhibited far superior stability as compared with the products using the comparative defoaming agents.

INDUSTRIAL APPLICABILITY

While the defoaming agent of the present invention can be used for all applications, it is effective for aqueous foamable liquid and can be applied to air foams that generate during various processes of industries such as paper pulp manufacturing industry (its pulping process, paper-making process, painting process, and the like), construction industry (its sheet making step and the like), dyestuff industry, dyeing industry, fermentation industry, synthetic resin manufacturing industry, synthetic rubber manufacturing industry, ink and paint industry, and fiber processing industry. Among them, the defoaming agent of the present invention is suited as a defoaming agent for paints, a defoaming agent for drainage treatment, and a defoaming agent for paper pulp manufacturing industry, and more suited as a defoaming agent for water-based paints, and it is best-suited as a defoaming agent for emulsion paints out of water-based paints (paint for water-based building exterior decoration, paint for building interior decoration, water-based ink, paint for paper coating, and the like).

The invention claimed is:

1. A method for producing an oil-in-water emulsion defoaming agent comprising hydrophilic fumed silica (C), wherein an oil phase (A) is emulsified and dispersed in a water phase (B), the method comprising:
   Step (i): a dispersing and disaggregating step of obtaining a dispersion liquid (BC1) having a median diameter (d50, by number) of hydrophilic fumed silica of 20 to 300 nm while dispersing and disaggregating the hydrophilic fumed silica (C) in the water phase (B), and
   Step (ii): an emulsifying and dispersing step of emulsifying and dispersing the dispersion liquid (BC1) prepared in the dispersing and disaggregating step (i) and the oil phase (A),
   to obtain an oil-in-water emulsion defoaming agent,
   wherein the oil phase (A) comprises prior to the emulsifying and dispersing step at least one nucleating agent (D) selected from the group consisting of hydrophobic silica (Da), a fatty acid amide (Db), a petroleum wax (De), a synthetic wax (Dd), and a vegetable wax (De);
   the weight ratio (A/C) of the oil phase (A) to the hydrophilic fumed silica (C) is 6 to 100, and
   the hydrophilic fumed silica (C) is a dry silica synthesized from vaporized silicon chloride via a vapor phase reaction in a hot hydrogen flame,
   the hydrophilic fumed silica (C) is not functionalized, and
   wherein the oil phase (A) includes one selected from the group consisting of mineral oils, esters of fatty acids having 6 to 22 carbon atoms or mixtures thereof with glycerol, monoalcohol fatty acid esters, silicones, polyethers and combinations thereof.

2. A method for producing an oil-in-water emulsion defoaming agent comprising hydrophilic fumed silica (C), wherein an oil phase (A) is emulsified and dispersed in a water phase (B), the method comprising:
   step (iii): a dispersing and disaggregating step of obtaining a dispersion liquid (BC2) having a median diameter (d50, by number) of hydrophilic fumed silica of 20 to 300 nm while dispersing and disaggregating the hydrophilic fumed silica (C) in a part of the water phase (B),
   Step (iv) a mixing and dispersing step of mixing and dispersing the oil phase (A) and the rest of the water phase (B) to obtain a mixed dispersion liquid (AB), and
   Step (v): an emulsifying and dispersing step of emulsifying and dispersing the mixed dispersion liquid (AB) and the dispersion liquid (BC2),
   to obtain an oil-in-water emulsion defoaming agent
   wherein the oil phase (A) comprises prior to the emulsifying and dispersing step at least one nucleating agent (D) selected from the group consisting of hydrophobic silica (Da), a fatty acid amide (Db), a petroleum wax (De), a synthetic wax (Dd), and a vegetable wax (De);
   the weight ratio (A/C) of the oil phase (A) to the hydrophilic fumed silica (C) is 6 to 100, and
   the hydrophilic fumed silica (C) is a dry silica synthesized from vaporized silicon chloride via a vapor phase reaction in a hot hydrogen flame, and
   the hydrophilic fumed silica (C) is not functionalized, and
   wherein the oil phase (A) includes one selected from the group consisting of mineral oils, esters of fatty acids having 6 to 22 carbon atoms or mixtures thereof with glycerol, monoalcohol fatty acid esters, silicones, polyethers and combinations thereof.

* * * * *